(12) United States Patent
Harada et al.

(10) Patent No.: US 11,825,247 B2
(45) Date of Patent: Nov. 21, 2023

(54) WIRING INFORMATION GENERATION SYSTEM, AND WIRING INFORMATION GENERATION METHOD

(71) Applicant: NIPPON TELEGRAPH AND TELEPHONE CORPORATION, Tokyo (JP)

(72) Inventors: Takumi Harada, Musashino (JP); Tomoya Hatano, Musashino (JP); Hiroo Suzuki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 113 days.

(21) Appl. No.: 17/602,805

(22) PCT Filed: Apr. 23, 2019

(86) PCT No.: PCT/JP2019/017180
§ 371 (c)(1),
(2) Date: Oct. 11, 2021

(87) PCT Pub. No.: WO2020/217300
PCT Pub. Date: Oct. 29, 2020

(65) Prior Publication Data
US 2022/0159358 A1 May 19, 2022

(51) Int. Cl.
*H04Q 11/00* (2006.01)
*H04L 41/12* (2022.01)

(52) U.S. Cl.
CPC ......... *H04Q 11/0066* (2013.01); *H04L 41/12* (2013.01); *H04Q 2011/0081* (2013.01)

(58) Field of Classification Search
CPC ................................................. H04Q 11/0062
See application file for complete search history.

(56) References Cited

U.S. PATENT DOCUMENTS

| | | | |
|---|---|---|---|
| 6,980,736 B1 * | 12/2005 | Fee ..................... | H04Q 11/0062 398/19 |
| 2020/0162314 A1 * | 5/2020 | Kawada .............. | H04L 12/4625 |

OTHER PUBLICATIONS

Zhang et al., "Failure Recovery Solutions Using Cognitive Mechanisms for Software Defined Optical Networks", 2016 15th International Conference on Optical Communications and Networks (ICOCN), IEEE, 2016 (Year: 2016).*

(Continued)

*Primary Examiner* — Shi K Li
(74) *Attorney, Agent, or Firm* — Harness, Dickey & Pierce, P.L.C.

(57) ABSTRACT

A wiring information creation system includes a switching device that switches a transmission path of an optical signal between an upper network and a lower network in units of combinations of physical ports, a switching control device that outputs, to the switching device, an instruction for switching the transmission path such that the transmission path passes through a selected physical port, a connection control device that determines whether a communication port of an intermediate communication device that relays communication between the upper network and the lower network and the selected physical port have been connected to each other and acquires, from the intermediate communication device, a number of the communication port connected to the selected physical port, and an information creation device that creates connection information indicating the communication port connected to the selected physical port and updates wiring information indicating connection information for each physical port of the switching device.

9 Claims, 17 Drawing Sheets

(56) References Cited

OTHER PUBLICATIONS

"Technical Basic Course [GE-PON Technology], 1st What is PON?", Nippon Telegraph and Telephone Corporation, NTT Technology Journal, Aug. 2005, pp. 71 to 74.

* cited by examiner

| SWITCHING DEVICE WIRING INFORMATION ||
|---|---|
| PHYSICAL PORT NUMBER | PHYSICAL PORT NUMBER |
| #11 | #21 |
| #12 | #22 |
| #41 | #23 |
| #42 | #24 |

Fig. 4

| ALLOCATION INFORMATION | | | |
| --- | --- | --- | --- |
| COMMUNICATION DEVICE INFORMATION | | COMMUNICATION DEVICE INFORMATION | |
| IDENTIFICATION INFORMATION SERIAL NUMBER | COMMUNICATION PORT NUMBER | COMMUNICATION PORT NUMBER | IDENTIFICATION INFORMATION SERIAL NUMBER |
| AAAA UPPER COMMUNICATION DEVICE #A | #1 | #1 | BBBB INTERMEDIATE COMMUNICATION DEVICE #B |
| AAAA UPPER COMMUNICATION DEVICE #A | #2 | #2 | BBBB INTERMEDIATE COMMUNICATION DEVICE #B |
| CCCC LOWER COMMUNICATION DEVICE #C | #1 | #3 | BBBB INTERMEDIATE COMMUNICATION DEVICE #B |
| CCCC LOWER COMMUNICATION DEVICE #C | #2 | #4 | BBBB INTERMEDIATE COMMUNICATION DEVICE #B |

Fig. 6

| PHYSICAL WIRING INFORMATION | | |
|---|---|---|
| SWITCHING DEVICE INFORMATION | COMMUNICATION DEVICE INFORMATION | |
| PHYSICAL PORT NUMBER | COMMUNICATION PORT NUMBER | IDENTIFICATION INFORMATION SERIAL NUMBER |
| #11 | #1 | AAAA UPPER COMMUNICATION DEVICE #A |
| #12 | #2 | |
| #21 | #1 | BBBB INTERMEDIATE COMMUNICATION DEVICE #B |
| #22 | #2 | |
| #23 | #3 | |
| #24 | #4 | |
| #31 | #1 | DDDD INTERMEDIATE COMMUNICATION DEVICE #D |
| #32 | #2 | |
| #33 | #3 | |
| #34 | #4 | |
| #41 | #1 | CCCC LOWER COMMUNICATION DEVICE #C |
| #42 | #2 | |

Fig. 8

| ITEM NUMBER | PHYSICAL WIRING INFORMATION ||||
| | SWITCHING DEVICE INFORMATION | MEASUREMENT INFORMATION | COMMUNICATION DEVICE INFORMATION ||
| | PHYSICAL PORT NUMBER | CONNECTION STATE | COMMUNICATION PORT NUMBER | SERIAL NUMBER |
|---|---|---|---|---|
| 1 | 1 | LINK-UP | 1 | BBBB INTERMEDIATE COMMUNICATION DEVICE #B |
| 2 | 2 | LINK-UP | 2 | BBBB INTERMEDIATE COMMUNICATION DEVICE #B |
| 3 | 3 | ERROR | | |
| 4 | 4 | LINK-UP | 2 | DDDD INTERMEDIATE COMMUNICATION DEVICE #D |
| 5 | 5 | LINK-UP | 3 | DDDD INTERMEDIATE COMMUNICATION DEVICE #D |
| 6 | 6 | UNUSED | | |
| 7 | 7 | UNUSED | | |
| 8 | 8 | UNUSED | | |

Fig. 10

| ITEM NUMBER | PHYSICAL WIRING INFORMATION ||||||
|---|---|---|---|---|---|---|
| | SWITCHING DEVICE INFORMATION | MEASUREMENT INFORMATION ||| COMMUNICATION DEVICE INFORMATION ||
| | PHYSICAL PORT NUMBER | CONNECTION STATE | SPEED | COMMUNICATION STANDARD | COMMUNICATION PORT NUMBER | SERIAL NUMBER |
| 1 | 1 | LINK-UP | 10G | SX | 1 | BBBB INTERMEDIATE COMMUNICATION DEVICE #B |
| 2 | 2 | LINK-UP | 1G | LR | 2 | BBBB INTERMEDIATE COMMUNICATION DEVICE #B |
| 3 | 3 | ERROR | | | | |
| 4 | 4 | LINK-UP | 10G | LX | 2 | DDDD INTERMEDIATE COMMUNICATION DEVICE #D |
| 5 | 5 | LINK-UP | | ERROR | 3 | DDDD INTERMEDIATE COMMUNICATION DEVICE #D |
| 6 | 6 | UNUSED | | | | |
| 7 | 7 | UNUSED | | | | |
| 8 | 8 | UNUSED | | | | |

Fig. 14

WIRING INFORMATION GENERATION SYSTEM, AND WIRING INFORMATION GENERATION METHOD

CROSS-REFERENCE TO RELATED APPLICATIONS

This application is a 371 U.S. National Phase of International Application No. PCT/JP2019/017180 filed on Apr. 23, 2019. The entire disclosures of the above application is incorporated herein by reference.

TECHNICAL FIELD

The present disclosure relates to a wiring information creation system and a wiring information creation method.

BACKGROUND ART

In optical communication networks, communication ports, packages, and devices for performing communication are designed with redundancy for a case in which the communication ports, the packages, and the devices break down or a case in which the packages and the devices are updated or replaced. In a case in which breakdown has occurred or the devices are to be updated or replaced, the optical communication networks switch the communication ports, the packages, and the devices to be used for communication using communication protocols or communication control schemes to cause the communication to be continued. Specific examples of the design with redundancy and the communication control schemes include the following examples. In a layer 2 protocol, link aggregation has widely been distributed as a scheme for route redundancy, device redundancy, and package redundancy. As a scheme for device redundancy and device redundancy, spanning tree protocol has widely been distributed.

While design with redundancy as described above has been distributed, an access section connecting devices installed on the side of users who use an optical communication network and an accommodation device that accommodates the devices are not designed with redundancy in many cases. This is because in the access section, the number of communication ports, packages, and devices that are targets to be designed to be redundant is very large and this leads to an increase in costs for the design with redundancy. In a case in which breakdown has occurred or packages and devices are to be updated or replaced for an access section that is not designed with redundancy, engineers visit the site to address the breakdown or perform updating or replacement.

It is necessary for the engineers to visit the site to address the breakdown or perform updating or replacement for an optical communication network that is not designed with redundancy, and this is one of the reasons that the costs incurred in running a communication system are high. Also, communication is continuously disconnected until the engineers complete addressing of the breakdown, updating, or replacement, and this is one of reasons that convenience for users is degraded.

CITATION LIST

Non Patent Document

Non Patent Literature 1: "Basic Course for Technology [GE-PON] Part 1, What is PON", Nippon Telegraph and Telephone Corporation, NTT Technical Journal, August, 2005, pp. 71 to 74

SUMMARY OF THE INVENTION

Technical Problem

In central offices such as data centers, engineers may manually set wiring between communication devices. Engineers who visit central offices have to correctly set wiring between specific communication ports of communication devices and physical ports of switching devices such as robot patch panels (RPPs) using optical fibers or communication cables based on written instructions. In this case, there is a risk that human errors may occur. In a case in which engineers at sites set wirings erroneously, it is necessary to set the wirings again.

Thus, it is required that operators set the wiring between communication devices in a remote manner instead of engineers visiting central offices. The operators switch the wiring inside switching devices connected to the communication devices in advance through remote operations.

In this case, the operators have to know information regarding the physical wiring between physical ports of the switching devices and communication ports of the communication devices in advance. For this purpose, it is necessary for the engineers who have visited central offices to accurately create information regarding the physical wiring between the physical ports of the switching devices and the communication ports of the communication devices based on details of wiring operations performed in the central offices. Here, it is desirable that systems create information regarding the physical wiring between the physical ports of the switching devices and the communication ports of the communication devices instead of the engineers in terms of reduction of a burden on the engineers and prevention of occurrence of human errors. However, systems in the related art cannot create information regarding the physical wiring between physical ports of switching devices and communication ports of communication devices.

In view of the aforementioned circumstances, an object of the present disclosure is to provide a wiring information creation system and a wiring information creation method capable of creating information regarding physical wiring between physical ports of switching devices and communication ports of communication devices.

Means for Solving the Problem

According to an aspect of the present disclosure, there is provided a wiring information creation system including a switching device configured to switch a transmission path of an optical signal between an upper network and a lower network in units of combinations of physical ports, a switching control device configured to output, to the switching device, an instruction for switching the transmission path such that the transmission path passes through a selected physical port of the physical ports, a connection control device configured to determine whether a communication port of an intermediate communication device that relays communication between the upper network and the lower network and the selected physical port are connected to each other and acquire, from the intermediate communication device, a number of the communication port connected to the selected physical port, and an information creation device configured to create connection information indicating the communication port connected to the selected physical port and update wiring information indicating connection information for each of the physical ports of the switching device.

According to an aspect of the present disclosure, in the aforementioned wiring information creation system, the connection control device determines whether the communication port of the intermediate communication device and the selected physical port connected to each other, based on a measurement result of light intensity of an optical signal in the transmission path of the selected physical port.

According to an aspect of the present disclosure, in the aforementioned wiring information creation system, the connection control device acquires the number of the communication port from the intermediate communication device by executing communication based on a link layer discovery protocol (LLDP) or loopback.

According to an aspect of the present disclosure, in the aforementioned wiring information creation system, the connection control device acquires information regarding a communication standard of an optical transceiver connected to the selected physical port, and the information creation device creates connection information that further indicates, for each of the physical ports of the switching device, a communication standard of the communication port of the intermediate communication device, based on the information regarding the communication standard of the optical transceiver that is acquired, and updates the wiring information indicating the connection information for each of the physical ports of the switching device.

According to an aspect of the present disclosure, in the aforementioned wiring information creation system, in a case in which link-down of the communication port of the intermediate communication device is detected, the information creation device includes error information in connection information of the communication port on which the link-down is detected.

According to an aspect of the present disclosure, in the aforementioned wiring information creation system, in a case in which link-up of the communication port that was linked down is detected, the information creation device newly creates connection information of the communication port on which link-up is detected, and in a case in which the connection information of the communication port that was linked down and the connection information that is newly created are identical, the information creation device deletes or overwrites the error information in the connection information of the communication port on which the link-down was detected.

According to an aspect of the present disclosure, in the aforementioned wiring information creation system, in a case in which link-up of the communication port that was linked down is detected, the information creation device newly creates connection information of the communication port on which the link-up is detected, and in a case in which the connection information of the communication port that was linked down and the connection information that is newly created are different from each other, the information creation device updates the wiring information based on the connection information that is newly created.

According to an aspect of the present disclosure, the aforementioned wiring information creation system further includes an intensity detection device configured to detect at least one of an increase in intensity of the optical signal or a decrease in intensity of the optical signal between the upper network and the lower network, in which the connection control device acquires a number of the communication port of the intermediate communication device connected to the physical port on which the increase in intensity of the optical signal is detected.

According to an aspect of the present disclosure, in the aforementioned wiring information creation system, the information creation device periodically selects a physical port of the physical ports of the switching device.

According to an aspect of the present disclosure, there is provided a wiring information creation method executed by a wiring information creation system, the method including outputting, to a switching device that switches a transmission path of an optical signal between an upper network and a lower network in units of combinations of physical ports, an instruction for switching the transmission path such that the transmission path passes through a selected physical port of the physical ports, determining whether a communication port of an intermediate communication device that relays communication between the upper network and the lower network and the selected physical port are connected to each other and acquiring, from the intermediate communication device, a number of the communication port connected to the selected physical port, and creating connection information indicating the communication port connected to the selected physical port and updating wiring information indicating connection information for each of the physical ports of the switching device.

Effects of the Invention

According to the present disclosure, it is possible to create information regarding physical wiring between a physical port of a switching device and a communication port of a communication device.

BRIEF DESCRIPTION OF DRAWINGS

FIG. 4 is a diagram illustrating an example of switching device wiring information.

FIG. 6 is a diagram illustrating an example of allocation information.

FIG. 8 is a diagram illustrating an example of physical wiring information.

FIG. 10 is a diagram illustrating an example of physical wiring information according to the first embodiment.

FIG. 14 is a diagram illustrating an example of physical wiring information according to the second embodiment.

DESCRIPTION OF EMBODIMENTS

Hereinafter, a wiring information creation system and a wiring information creation method according to embodiments of the present disclosure will be described with reference to drawings. Note that in the following embodiments, repeated description will be appropriately omitted on the assumption that components with the same reference signs applied thereto perform similar operations.

Figure 1:
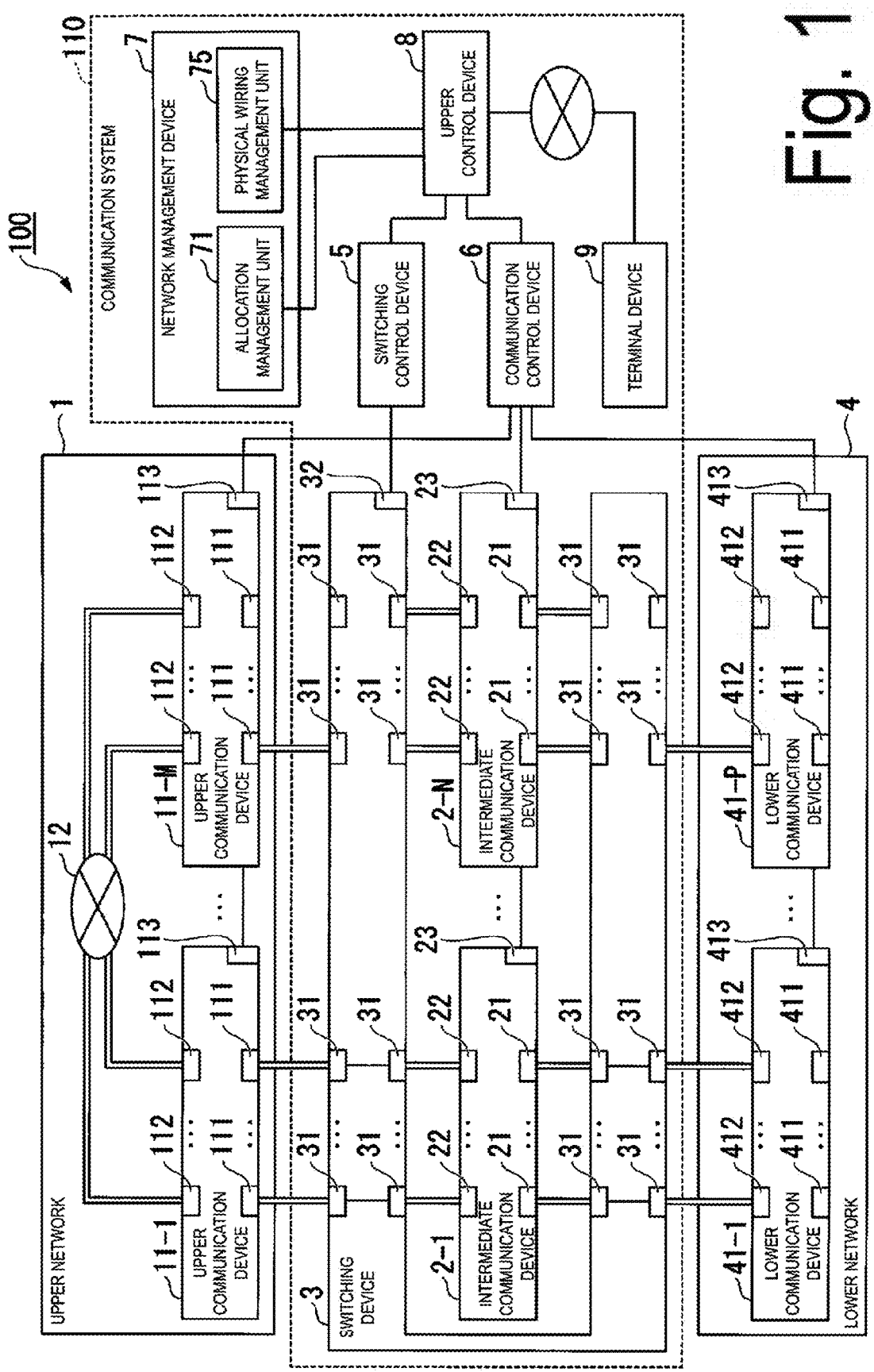
FIG. 1 is a diagram illustrating a configuration example of an optical communication network.

FIG. 1 is a diagram illustrating a configuration example of an optical communication network 100. The optical communication network 100 includes an upper network 1, a communication system 110, and a lower network 4. The communication system 110 relays optical signals used in communication between the upper network 1 and the lower network 4. The communication system 110 enables communication between the upper network 1 and the lower network 4 to be designed with redundancy and enables running costs of the optical communication network 100 to be reduced.

In a case in which the upper network 1 is a network connected to a backbone network, and the lower network 4 is a user-side network, for example, the communication system 110 is provided in a central office that accommodates a communication line with the user-side network and relays communication between the backbone network and the user-side network. Also, in a case in which the upper network 1 is a network that connects a baseband unit (BBU) of a mobile communication system and a backhaul, and the lower network 4 is a network including a plurality of antenna devices (RRHs), the communication system 110 is provided in a central office that accommodates a communication line between each RRH and the BBU and relays communication between the BBU and the RRH. Hereinafter, although a case in which the communication system 110 relays communication between a backbone network and a user-side network will be described in the embodiments, targets of application of the communication system 110 are not limited thereto.

The upper network 1 includes a communication line 12 that is connected to the backbone network or another optical communication network and M upper communication devices 11 (11-1, ..., 11-M) connected to the communication line 12. The upper communication device 11 includes a plurality of one communication port 111, a plurality of communication ports 112, and a setting port 113. The communication ports 112 are connected to the communication line 12. The communication port 111 is connected to the communication system 110. The setting port 113 is connected to the communication system 110 and receives device setting information. The device setting information supplied to the setting port 113 defines operations of the upper communication device 11 related to relay of optical signals between the communication port 112 and the communication port 111 and signal processing. The upper communication device 11 relays communication between the communication line 12 and the communication system 110 based on the device setting information. Each of the numbers of communication ports 111 and communication ports 112 included in the upper communication device 11 may be one.

The lower network 4 includes P communication devices 41 (41-1, ..., 41-P) connected to user-side devices. The lower communication device 41 includes a plurality of communication ports 411, a plurality of communication ports 412, and a setting port 413. The communication ports 412 are connected to the communication system 110. The communication ports 411 are connected to user-side devices. The setting port 413 is connected to the communication system 110 and receives device setting information. The device setting information supplied to the setting port 413 defines operations of the lower communication device 41 related to relay of optical signals between the communication ports 412 and the communication ports 411 and signal processing. The lower communication device 41 relays communication between the communication system 110 and user-side devices based on the device setting information. Each of the numbers of communication ports 411 and communication ports 412 included in the lower communication device 41 may be one.

M and P represent the numbers of upper communication devices 11 and lower communication devices 41, respectively, and are integers that are equal to or greater than one. In the configuration example illustrated in FIG. 1, although a case in which each of the numbers of upper communication devices 11 and lower communication devices 41 is equal to or greater than two is illustrated, one or both of the numbers of upper communication devices 11 and lower communication devices 41 may be one.

The communication system 110 includes N intermediate communication devices 2 (2-2, ..., 2-N), a switching device 3, a switching control device 5, a communication control device 6, a network management device 7, an upper control device 8, and a terminal device 9. Each intermediate communication device 2 includes at least one communication port 22 used for communication with the upper network 1, at least one communication port 21 used for communication with the lower network 4, and a setting port 23 that inputs device setting information. The device setting information defines operations of the intermediate communication device 2 related to relay of optical signals between the communication port 22 and the communication port 21. The communication port 22 is also referred to as an upper port of the intermediate communication device 2. Also, the communication port 21 is also referred to as a lower port of the intermediate communication device 2.

The intermediate communication device 2 outputs, from any of the communication ports 21, an optical signal input from the communication port 22 based on the device setting information supplied from the communication control device 6 to the setting port 23. The optical signal input front the communication port 22 may be output from one communication port 21 or may be output from a plurality of communication ports 21. In a case in which the optical signal includes signals of a plurality of wavelength division multiplexed wavelength signals, for example, a signal of each wavelength separated from the optical signal may be output to the plurality of communication ports 21 based on an output destination defined for each wavelength in the device setting information. Also, the intermediate communication device 2 outputs, from any of the communication ports 22, an optical signal input from the communication port 21 in accordance with the device setting information. In a case in which wavelength division multiplexed optical signals are used for communication with the upper network 1, for example, the intermediate communication device 2 synthesizes optical signals with different wavelength from among optical signals input from the communication port 21 and outputs one optical signal obtained through the synthesis from the communication port 22. Signal processing performed on the optical signals input from the communication port 21 and the communication port 22 is not limited to the aforementioned example.

At least one of the plurality of intermediate communication devices 2 has communication ports 21 and 22 that do not relay communication between the upper network 1 and the lower network 4 in a case in which another intermediate communication device 2 breaks down or in a case in which communication ports 21 and 22 of another intermediate communication device 2 break down. Also, in at least one of the plurality of intermediate communication device 2, all the communication ports 21 and 22 may not relay the communication between the upper network 1 and the lower network 4. Such an intermediate communication device 2 is a spare device provided in case of breakdown, updating, or replacement of another intermediate communication device 2. The communication system 110 may include one or more intermediate communication devices 2 as spare devices.

The switching device 3 includes a plurality of physical ports 31 and a control port 32, Each physical port 31 is connected to any one of the communication ports 111 included in the upper communication device 11, the communication ports 21 and 22 included in the intermediate communication device 2, and the communication ports 412 included in the lower communication device 41. Each physical port 31 includes a connector with a form in accordance with a connector attached to an optical fiber cable and performs input and output of optical signals. The switching device 3 receives control information from the switching control device 5 via the control port 32. The switching device 3 connects two physical ports among a plurality of physical ports in accordance with the control information and enables transmission of optical signals between the two physical ports. For example, the switching device 3 is configured to switch an optical fiber cable for connection between the physical port 31 and another physical port 31 with a robot arm. Alternatively, the switching device 3 includes a micro-electro-mechanical systems (MEMS) mirror device and enables transmission of optical signals between the two physical ports 31 via the MEMS mirror under control. The switching device 3 is not limited to the aforementioned example and may be configured to be able to change the transmission path for optical signals by selecting a pair of two physical ports 31.

The switching control device 5 controls the switching device 3 in response to an instruction received from the upper control device 8. The instruction received from the upper control device 8 indicates that two physical ports 31 are to be connected. The instruction may indicate that a plurality of pairs of physical ports 31 are to be connected.

The communication control device 6 supplies device setting information to the upper communication device 11, the intermediate communication device 2, and the lower communication device 41 and controls operations of each of the upper communication device 11, the intermediate communication device 2, and the lower communication device 41, in response to instructions received from the upper control device 8. Device setting information supplied to the upper communication device 11 defines signal processing to be performed on optical signals input from the communication ports 111 and the communication ports 112 of the upper communication device 11 and the communication ports 111 or the communication ports 112 to which optical signals obtained through the signal processing are to be output. Similarly, device setting information supplied to the lower communication device 41 defines signal processing to be performed on optical signals input from the communication ports 411 and the communication ports 412 and the communication ports 411 or the communication ports 412 to which optical signals obtained through the signal processing are to be output.

The network management device 7 includes an allocation management unit 71 and a physical wiring management unit 75. The allocation management unit 71 performs storage and updating of allocation information. The allocation information includes information indicating connection between the communication ports 111 of the upper communication device 11 and the communication ports 22 of the intermediate communication device 2 connected via the switching device 3 and information indicating connection between the communication ports 21 of the intermediate communication device 2 and the communication ports 412 of the lower communication device 41 connected via the switching device 3. The allocation information indicates the intermediate communication device 2 and the communication ports 21 and 22 thereof allocated to the communication between the upper network 1 and the lower network 4.

The physical wiring management unit 75 performs storage and updating of physical wiring information. The physical wiring information includes information indicating connection between the communication ports 111 of the upper communication device 11 and the physical ports 31 of the switching device 3, information indicating connection between the switching device 3 and the communication ports 21 and 22 of the intermediate communication device 2, and information indicating connection between the physical ports 31 of the switching device 3 and the communication ports 412 of the lower communication device 41. The physical wiring information indicates connection between each of the communication ports of the upper communication device 11, the intermediate communication device 2, and the lower communication device 41 and the physical ports 31 of the switching device 3.

The upper control device 8 supplies an instruction for switching connection of the physical ports 31 to the switching control device 5 in response to an instruction received from the terminal device 9 connected via another network. The terminal device 9 receives inputs from engineers who run and maintain the optical communication network 100 and supplies instructions to the upper control device 8. The terminal device 9 is provided at a location different from the location of the central office where the intermediate communication device 2 and the switching device 3 are installed, and engineers operate the switching device 3 through remote operations. The communication system 110 acquires state information regarding a communication state between the upper network 1 and the lower network 4 via the terminal device 9. The state information indicates, for example, communication disconnection in the optical communication network 100, breakdown of the intermediate communication device 2, breakdown of the communication ports 21 and 22 of the intermediate communication device 2, or a change in communication line to be provided to users who use the optical communication network 100.

For example, the engineers receive contact regarding breakdown of the intermediate communication device 2 and contact regarding communication disconnection from users who use the optical communication network 100 and operate the switching device 3. The engineers switch the intermediate communication device 2 and the communication ports 21 and 22 to be allocated to communication through operations of the switching device 3 for recovery from the breakdown or the communication disconnection. Also, the engineers operate the switching device 3 in response to requests from the users who use the optical communication network 100. Examples of requests from the users include changes in band of communication lines provided to the users, stopping of utilization of communication lines, addition of new communication lines, and the like. In a case in which such requests are received, the optical communication network 100 changes the intermediate communication device 2 to be connected to the lower communication device 41, changes communication ports 21 of the intermediate communication device 2 to be connected to the lower communication device 41, and increases or reduces the number of communication ports 21 to be connected to the lower communication device 41.

The communication system 110 switches the intermediate communication device 2 allocated to the relay of the communication between the upper network 1 and the lower network 4 and the communication ports 21 and 22 thereof, using the switching device 3. Through the switching of the intermediate communication device 2 or the communication ports 21 and 22 using the switching device 3, it is possible to recover from breakdown of the intermediate communication device 2 or update or replace the intermediate communication device 2 without a need for the engineers to visit the central office where the intermediate communication device 2 is installed. The communication system 110 can reduce the running costs of the optical communication network 100 and shorten the period of time during which communication cannot be performed by eliminating a necessity of the engineers to perform operations in the central office.

Also, since the communication system 110 can freely change the intermediate communication device 2 to be connected to the upper network 1 and the lower network 4, it is possible to achieve design of each intermediate communication device 2 with redundancy without providing a spare device for each intermediate communication device 2 used for communication. The communication system 110 can also reduce costs incurred to design the intermediate communication device 2 with redundancy by including the intermediate communication devices 2 such that the numbers thereof correspond to a level of redundancy. Also, the communication system 110 can also change the communication lines to be provided to the users in a shorter time as compared with a case in which engineers visit central office, by switching the connection using the switching device 3.

Figure 2:
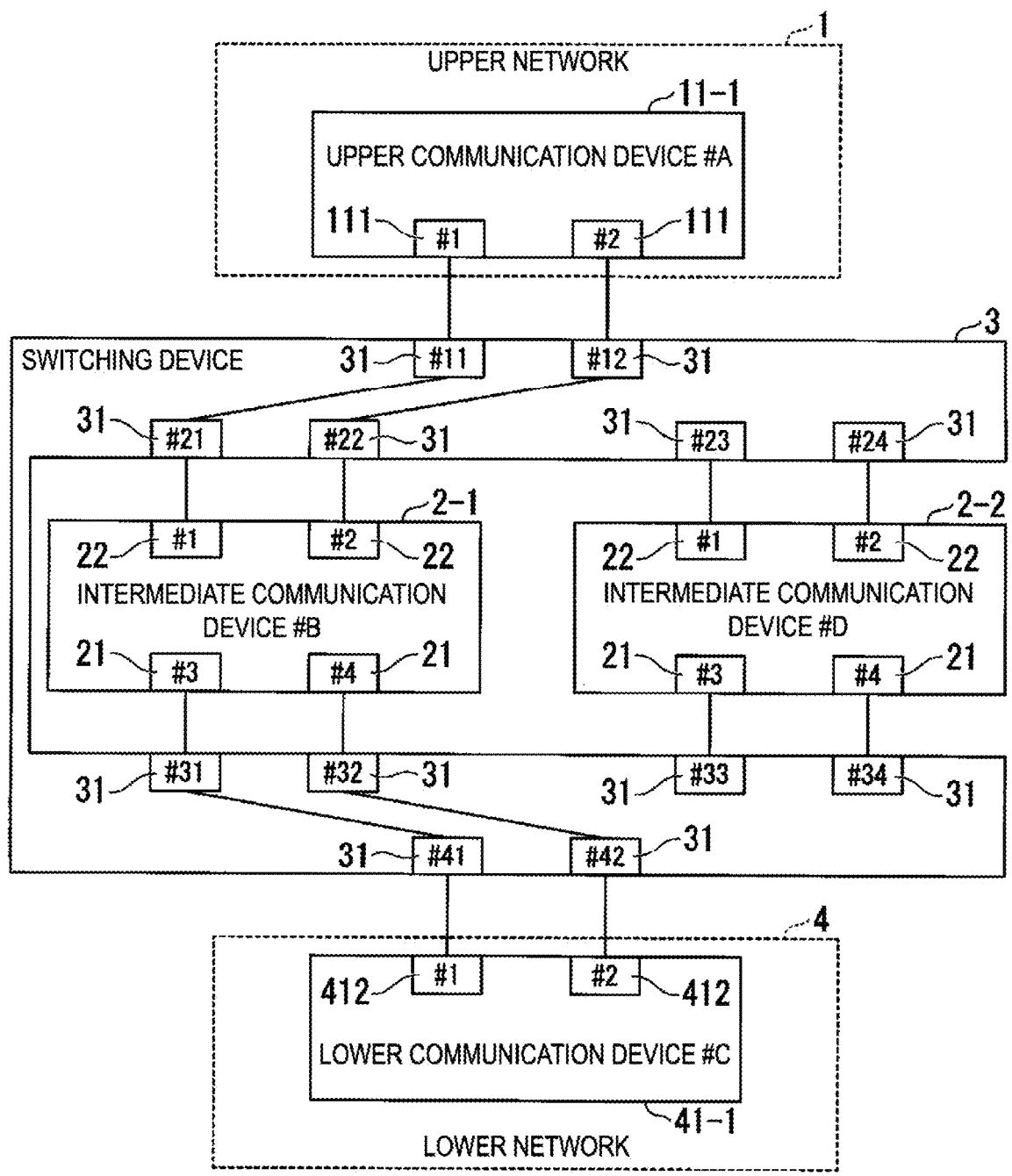
FIG. 2 is a diagram illustrating a connection example between each of an upper communication device, an intermediate communication device, and a lower communication device and a switching device.

Hereinafter, configurations of the switching control device 5, the allocation management unit 71, and the physical wiring management unit 75 will be described. Here, the connection example illustrated in FIG. 2 will be used for specifically explaining connection between each of the upper communication device 11, the intermediate communication devices 2, and the lower communication device 41 and the switching device 3. FIG. 2 is a diagram illustrating a connection example between each of the upper communication device 11, the intermediate communication devices 2, and the lower communication device 41 and the switching device 3. In the connection example illustrated in FIG. 2, the upper network 1 includes an upper communication device 11-1 "#A", the communication system 110 includes an intermediate communication device 2-1 "#B" and an intermediate communication device 2-2 "#D", and the lower network 4 includes a lower communication device 41-1 "#C". Further, the upper communication device 11-1 "#A" includes two communication ports 111 "#1" and "#2". Each of the intermediate communication devices 2-1 "#B" and 2-2 "#D" includes two communication ports 22 "#1" and "#2" and two communication ports 21 "#3" and "#4". The lower communication device 41-1 "#C" includes two communication ports 412 "#1" and "#2". The communication ports and the physical ports to which the same names and reference signs are applied will be distinguished with combinations of "#" and numbers.

Twelve physical ports 31 "#11", "#12", "#21", "#22", "#23", "#24", "#31", "#32", "#33", "#34", "#41", and "#42" from among the plurality of physical ports 31 included in the switching device 3 are used for connection to the upper communication device 11, the intermediate communication devices 2, and the lower communication device 41. The connection example illustrated in FIG. 2 illustrates physical ports 31 used for connection from among the plurality of physical ports 31 included in the switching device 3.

The physical ports 31 "#11" and "#12" are connected to the communication ports 111 "#1" and "#2" of the upper communication device 11-1 "#A", respectively. The physical ports 31 "#21" and "#22" are connected to the communication ports 22 "#1" and "#2" of the intermediate communication device 2-1 "#B", respectively. The physical ports 31 "#23" and "#24" are connected to the communication ports 22 "#1" and "#2" of the intermediate communication device 2-2 "#D", respectively. The physical ports 31 "#31" and "#32" are connected to the communication ports 21 "#3" and "#4" of the intermediate communication device 2-1 "#B", respectively. The physical ports 31 "#33" and "#34" are connected to the communication ports 21 "#3" and "#4" of the intermediate communication device 2-2 "#D", respectively. The physical ports 31 "#41" and "#42" are connected to the communication ports 412 "#1" and "#2" of the lower communication device 41-1 "#C", respectively.

In the switching device 3, the physical ports 31 "#11" and "#12" are connected to the physical ports 31 "#21" and "#22", respectively. The physical ports 31 "#31" and "#32" are connected to the physical ports 31 "#41" and "#42", respectively. The connection between the physical ports 31 in the switching device 3 can be switched as described above.

Figure 3:
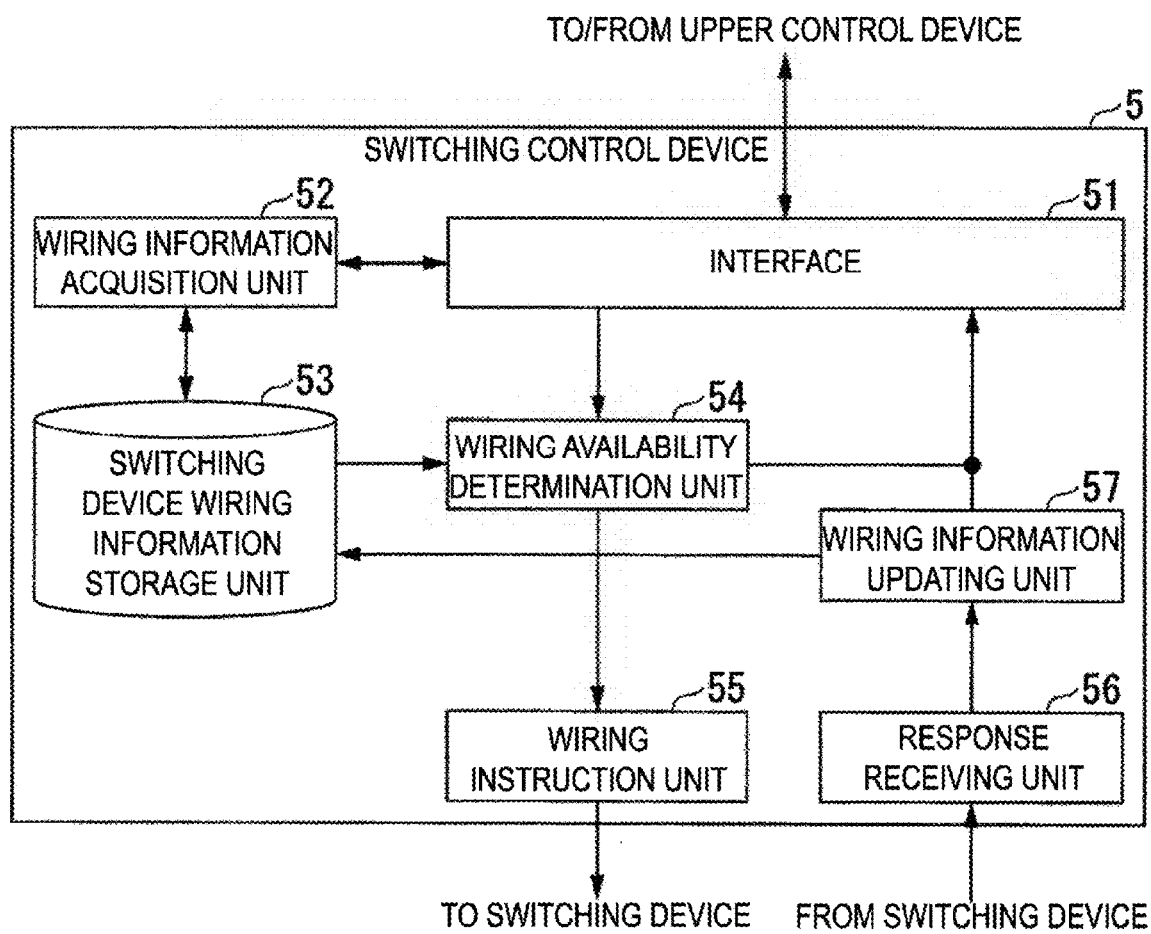
FIG. 3 is a block diagram illustrating a configuration example of a switching control device.

FIG. 3 is a block diagram illustrating a configuration example of the switching control device 5. The switching control device 5 includes an interface 51, a wiring information acquisition unit 52, a switching device wiring information storage unit 53, a wiring availability determination unit 54, a wiring instruction unit 55, a response receiving unit 56, and a wiring information updating unit 57. The interface 51 performs inputs to and outputs from the upper control device 8.

The interface 51 receives connection change information and request information as control information from the upper control device 8. The connection change information indicates an instruction for changing connection between the physical ports 31 in the switching device 3. The request information indicates a request for switching device wiring information stored in the switching device wiring information storage unit 53. The interface 51 notifies the upper control device 8 of a response indicating completion or unavailability of change in connection based on the connection change information. In addition, the interface 51 supplies the switching device wiring information as a response to the request information to the upper control device 8.

If the interface 51 receives the request information, then the wiring information acquisition unit 52 reads the switching device wiring information stored in the switching device wiring information storage unit 53 and supplies the read switching device wiring information to the interface 51.

The switching device wiring information storage unit 53 stores the switching device wiring information. The switching device wiring information indicates connection between the physical ports 31 in the switching device 3. The switching device wiring information includes information indicating a pair of physical port numbers for identifying two connected physical ports 31. FIG. 4 is a diagram illustrating an example of the switching device wiring information. The switching device wiring information illustrated in FIG. 4 illustrates connection between the physical ports 31 in the connection example illustrated in FIG. 2. The switching device wiring information illustrated in FIG. 4 includes the pair of physical port numbers "#11" and "#21" and indicates that the physical ports 31 indicated by the physical port numbers are connected to each other. Similarly, the switching device wiring information indicates that the physical ports 31 "#12" and "#22" are connected to each other, the physical ports 31 "#41" and "#23" are connected to each other, and the physical ports 31 "#42" and "#24" are connected to each other. Note that the switching device wiring information may be divided into upper wiring information indicating a pair of physical port numbers related to connection between the upper network 1 and the communication port 22 and lower wiring information indicating a pair of physical port numbers related to connection between the lower network 4 and the communication port 22.

If the interface 51 receives connection change information, then the wiring availability determination unit 54 determines whether it is possible to change connection as indicated by the connection change information, based on the switching device wiring information. In a case in which it is possible to change connection, the wiring availability determination unit 54 supplies the connection change information to the wiring instruction unit 55. In a case in which it is not possible to change connection, the wiring availability determination unit 54 notifies the interface 51 of a response indicating that it is not possible to change the connection. In a case in which the connection change information indicates an instruction for a change of connecting the physical port 31 "#23" to the physical port 31 "#12" that has already been connected to the physical port 31 "#22", the wiring availability determination unit 54 determines that it is not possible to connect a plurality of physical ports to the physical port 31 "#12" and determines that it is not possible to achieve the connection. At this time, the wiring availability determination unit 54 supplies a response indicating that it is not possible to change the connection to the interface 51.

The wiring instruction unit 55 supplies an instruction for changing the connection based on the connection change information to the control port 32 of the switching device 3. The response receiving unit 56 receives a response indicating completion of the change in connection in accordance with the connection change information from the control port 32 of the switching device 3. If the response receiving unit 56 receives the response indicating the completion of the change in connection, then the response receiving unit 56 notifies the wiring information updating unit 57 of the reception of the response. The wiring information updating unit 57 updates the switching device wiring information in accordance with the change in connection indicated by the connection change information. If the wiring information updating unit 57 ends the updating of the switching device wiring information, then the wiring information updating unit 57 notifies the interface 51 of the response indicating the completion of the change in connection based on the connection change information. The interface 51 supplies, to the upper control device 8, the response indicating the completion of the change in connection based on the connection change information in response to the notification.

Figure 5:
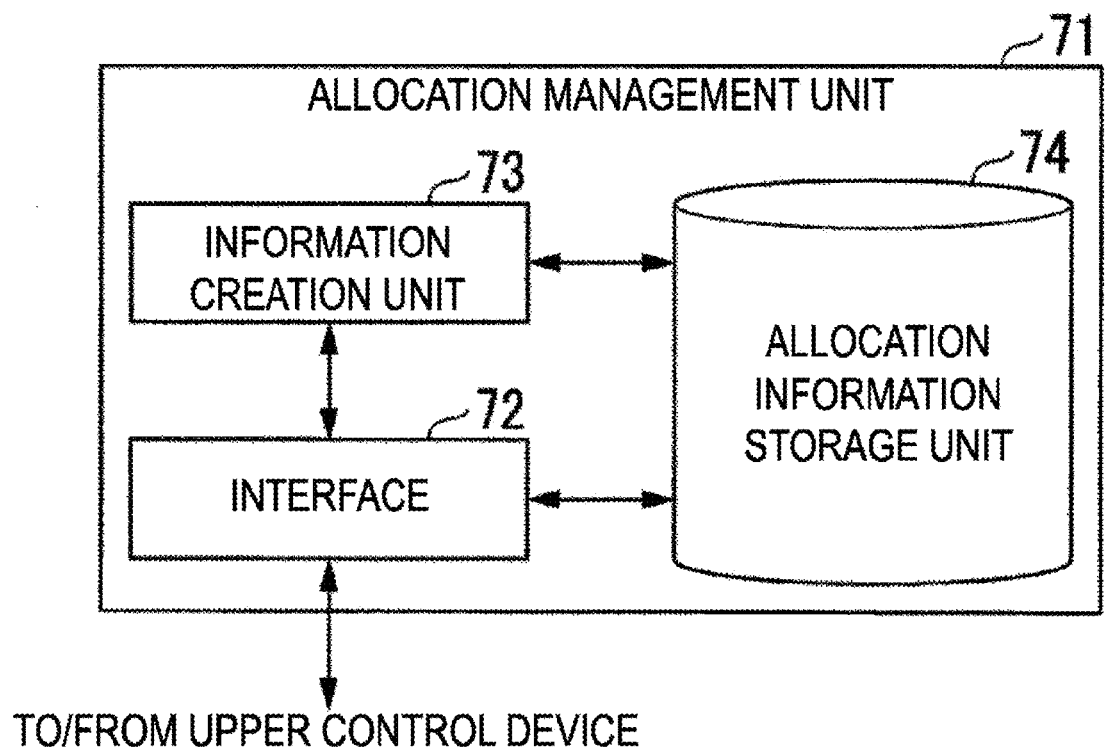
FIG. 5 is a block diagram illustrating a configuration example of an allocation management unit.

FIG. 5 is a block diagram illustrating a configuration example of the allocation management unit 71. The allocation management unit 71 includes an interface 72, an information creation unit 73, and an allocation information storage unit 74. The interface 72 receives instructions for requesting allocation information and for updating the allocation information from the upper control device 8. If an instruction for requesting allocation information is received, then the interface 72 reads allocation information stored in the allocation information storage unit 74 and supplies the read allocation information to the upper control device 8.

If the interface 72 receives an instruction for updating the allocation information, then the interface 72 notifies the information creation unit 73 of the instruction for updating the allocation information. If the information creation unit 73 receives the instruction for updating the allocation information, then the information creation unit 73 requests the upper control device 8 for switching device wiring information and physical wiring information via the interface 72. The interface 72 supplies, to the information creation unit 73, the switching device wiring information and the physical wiring information received as a response to the request. The information creation unit 73 creates allocation information based on the switching device wiring information and the physical wiring information and updates allocation information stored in the allocation information storage unit 74 with the created allocation information.

FIG. 6 is a diagram illustrating an example of the allocation information. The allocation information includes communication device information related to each of the upper communication device 11, the intermediate communication devices 2, and the lower communication device 41 included in the optical communication network 100. The communication device information includes identification information for identifying each of the upper communication device 11, the intermediate communication devices 2, and the lower communication device 41 and the communication port number for identifying each of communication ports included in the devices. In other words, the communication device information uniquely specifies communication ports in the communication system 110. Also, the allocation information indicates the intermediate communication device 2 and the communication ports 21 and 22 allocated to the communication between the upper network 1 and the lower network 4.

In the allocation information illustrated in FIG. 6, device serial numbers "AAAA", "BBBB", and "CCCC" are used as identification information of the upper communication device 11-1 "#A", the intermediate communication device 2-1 "#B", and the lower communication device 41-1 "#C", respectively. Also, "#1", "#2", "#3", and "#4" are used as communication port numbers indicating the communication ports of the devices. Although a case in which the serial numbers are used as identification information will be described, the upper communication device 11, the intermediate communication device 2, and the lower communication device 41 may be identified using something other than the serial numbers. For example, any one or a combination of media access control (MAC) addresses, host names, device names, Internet protocol (IP) addresses, and the like allocated to the upper communication device 11, the intermediate communication device 2, and the lower communication device 41 may be used as the identification information.

The allocation information indicating the connection example illustrated in FIG. 2 indicates that the communication port 111 "#1" of the upper communication device 11-1 "#A" corresponds to the communication port 22 "#1" of the intermediate communication device 2-1 "#B" and the communication ports thereof are connected to each other, as illustrated in FIG. 6. Similarly, the allocation information indicates that the communication port 111 "#2" of the upper communication device 11-1 "#A" and the communication port 22 "#2" of the intermediate communication device 2-1 are connected to each other. Further, the allocation information indicates that the communication port 21 "#3" of the intermediate communication device 2-1 "#13" and the communication port 42 "#1" of the lower communication device 41-1 "#C" are connected to each other and that the communication port 21 "#4" of the intermediate communication device 2-1 "#B" and the communication port 42 "#2" of the lower communication device 41-1 "#C" are connected to each other.

Figure 7:
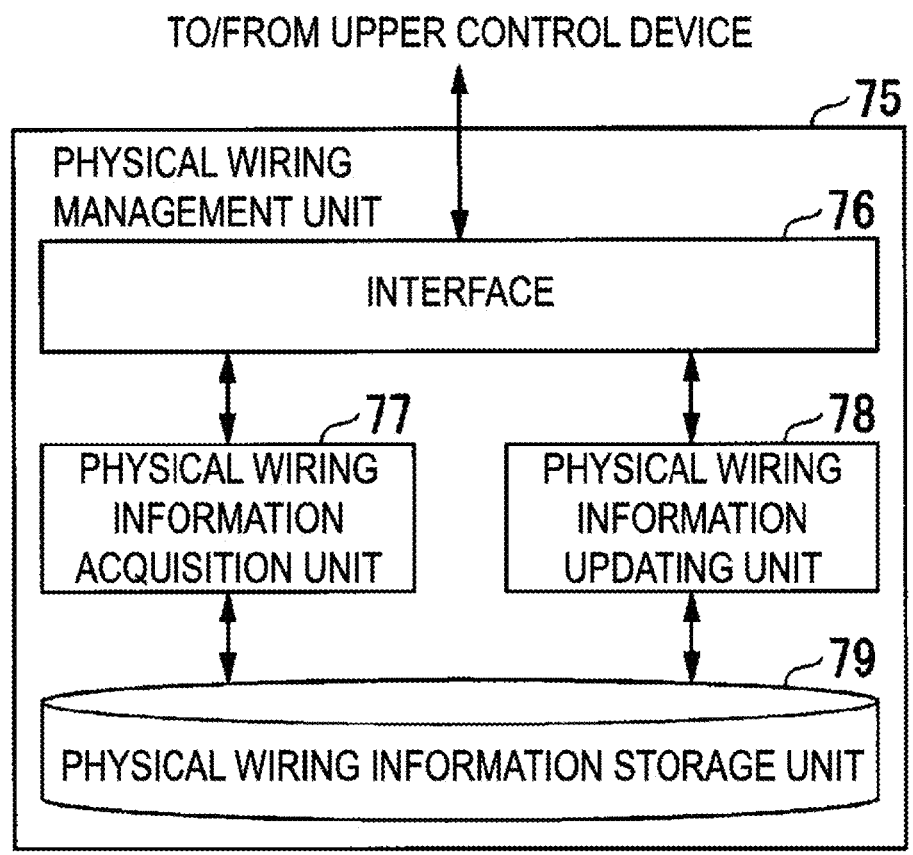
FIG. 7 is a block diagram illustrating a configuration example of physical wiring management unit.

FIG. 7 is a block diagram illustrating a configuration example of the physical wiring management unit 75. The physical wiring management unit 75 includes an interface 76, a physical wiring information acquisition unit 77, a physical wiring information updating unit 78, and a physical wiring information storage unit 79. The interface 76 receives an instruction for requesting or updating physical wiring information from the upper control device 8. If the instruction for requesting physical wiring information is received, then the interface 76 notifies the physical wiring information acquisition unit 77 of the instruction. The interface 76 receives the physical wiring information as a response to the instruction from the physical wiring information acquisition unit 77 and supplies the physical wiring information to the upper control device 8. If the interface 76 receives an instruction for updating the physical wiring information, then the interface 76 requests the upper control device 8 for physical wiring changing information. The physical wiring changing information indicates a change in connection between each of the upper communication device 11, the intermediate communication device 2, and the lower communication device 41 and the switching device 3. If the physical wiring changing information is received, then the interface 76 supplies the physical wiring changing information to the physical wiring information updating unit 78.

The physical wiring information acquisition unit 77 reads physical wiring information from the physical wiring information storage unit 79 and supplies the read physical wiring information to the interface 76 in response to an instruction from the interface 76. If the physical wring information updating unit 78 receives the physical wiring changing information from the interface 76, then the physical wiring information updating unit 78 updates the physical wiring information stored in the physical wiring information storage unit 79 based on the change in connection indicated by the physical wiring changing information.

FIG. 8 is a diagram illustrating an example of the physical wiring information. The physical wiring information includes switching device information or the physical port numbers indicating the physical ports 31 of the switching device 3, and communication device information related to each of the upper communication device 11, the intermediate communication device 2, and the lower communication device 41. The physical wiring information indicates communication ports of any of the upper communication device 11, the intermediate communication device 2, and the lower communication device 41 connected to the physical ports 31. In a case in which communication ports of any of the upper communication device 11, the intermediate communication device 2, and the lower communication device 41 are not connected to the physical ports 31, empty (NULL) information is associated in the physical port numbers of the physical ports 31 in the physical wiring information.

In the physical wiring information illustrated in FIG. 8, serial numbers "AAAA", "BBBB", and "CCCC" are used as identification information of the upper communication device 11-1 "#A", the intermediate communication device 2-1 "#B", and the lower communication device 41-1 "#C", similarly to the example illustrated in FIG. 6. Also, "#1", "#", "#3", and "#4" are used as communication port numbers indicating the communication ports of the devices. In addition, "#11", "#12", "#21", "#22", "#23", "#24", "#31", "#32", "#33", "#34", "#41", and "#42" are used as physical port numbers indicating the physical ports 31.

The physical wiring information indicating the connection example illustrated in FIG. 2 indicates that the physical port 31 "#11" corresponds to the communication port 111 "#1" of the upper communication device 11-1 "A" and that the ports thereof are connected to each other, as illustrated in FIG. 8. Similarly, the physical wiring information indicates that the physical port 31 "#12" and the communication port 111 "#2" of the upper communication device 11-1 are connected to each other. Also, the physical wiring information indicates that the physical ports 31 "#21", "#22", "#23", and "#24" are connected to the communication port 22 "#1", the communication port 22 "#2", the communication port 21 "#3", and the communication port 21 "#4" of the intermediate communication device 2-1, respectively. Also, the physical wiring information indicates that the physical ports 31 "#31", "#32", "#33", and "#34" are connected to the communication port 22 "#1", the communication port 22 "#2", the communication port 21 "#3", and the communication port "#4" of the intermediate communication device 2-2, respectively. Also, the physical wiring information indicates that physical ports 31 "#41" and "#42" are connected to the communication ports 412 "#1" and "#2" of the lower communication device 41-1, respectively.

Next, a configuration example of the wiring information creation system will be described.

First Embodiment

Figure 9:
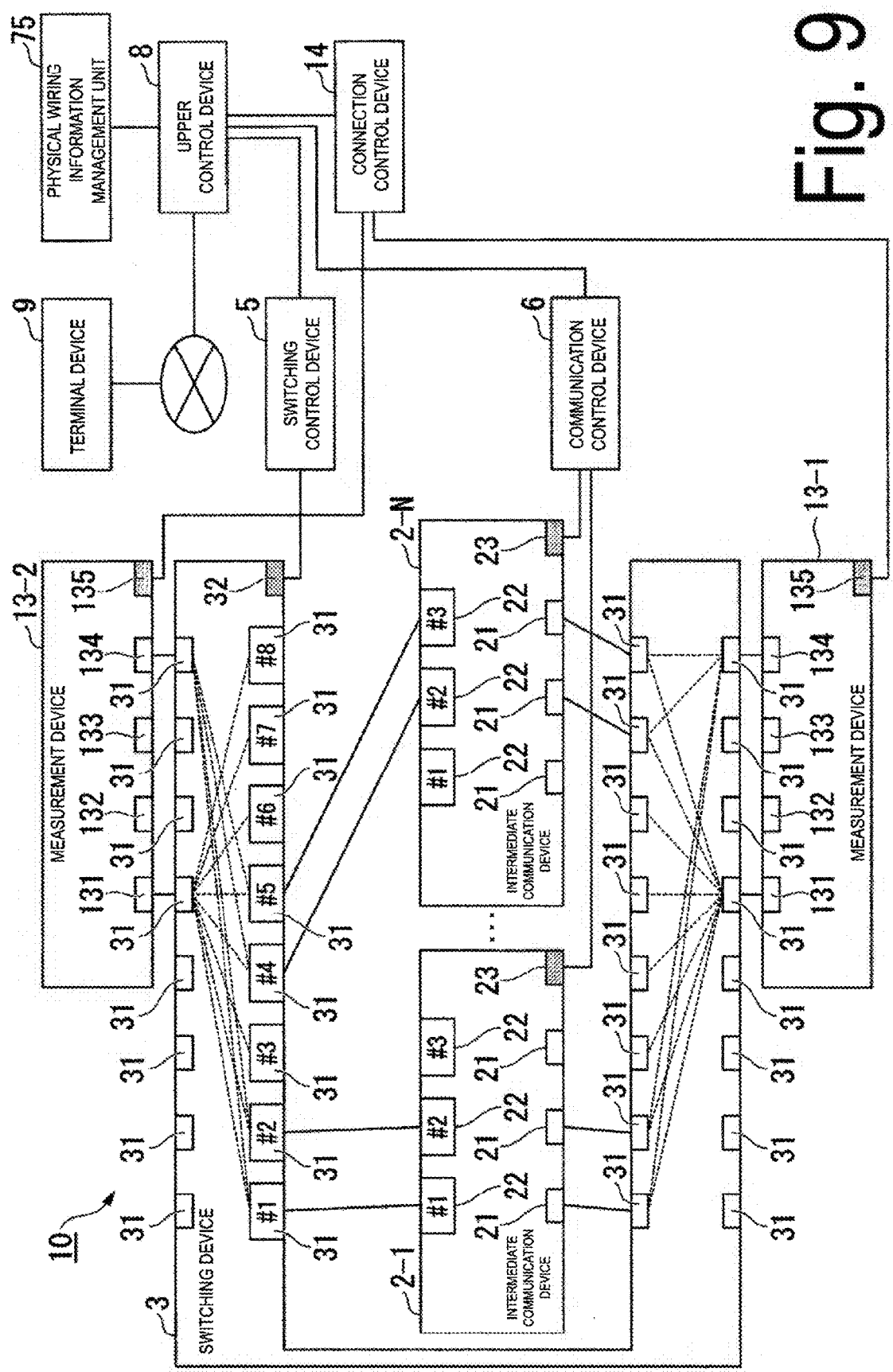
FIG. 9 is a diagram illustrating a configuration example of a wiring information creation system according to a first embodiment.

FIG. 9 is a diagram illustrating a configuration example of a wiring information creation system 10. The wiring information creation system 10 is a device that creates information (physical wiring information) regarding physical wiring between physical ports of a switching device 3 and communication ports of an intermediate communication device 2 in a communication system 110. The wiring information creation system 10 creates the physical wiring information illustrated in FIG. 8, for example.

The wiring information creation system 10 includes the switching device 3, a switching control device 5, intermediate communication devices 2-1 to 2-N ("N" is an integer that is equal to or greater than two; hereinafter, "N=2"), a communication control device 6, a terminal device 9, measurement devices 13-1 to 13-R ("R" is an integer that is equal to or greater than two; hereinafter, "R=2"), a connection control device 14, and an upper control device 8.

These devices may be provided as a single device, for example, as a control unit. For example, the measurement devices 13-1 to 13-R may be a single device. In other words, the measurement devices 13-1 to 13-R may be integrated in the same casing. Some or all of the switching control device 5, the intermediate communication devices 2, the communication control device 6, the upper control device 8, the terminal device 9, the measurement devices and the connection control device 14 are implemented as software by a processor such as a central processing unit (CPU) reading and executing a program stored in a memory that is a non-volatile recording medium (non-transitory recording medium). The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium like a storage device such as a hard disk incorporated in the computer system. The program may be transmitted via an electrical communication line. Some or all of the switching control device 5, the intermediate communication devices 2, the communication control device 6, the upper control device 8, the terminal device 9, the measurement device 13, and the connection control device 14 may be implemented as hardware including an electronic circuit (or circuitry) using a large scale integration circuit (LSI), an application specific integrated circuit (ASIC), a programmable logic device (PLD), or a field programmable gate array (FPGA), for example.

The switching control device 5, the communication control device 6, the upper control device 8, and the connection control device 14 communicate with each other using an application programming interface (API), for example.

The intermediate communication devices 2 relay communication between the upper network 1 and the lower network 4. The intermediate communication devices 2 are accommodation devices that accommodate the communication between the upper network 1 and the lower network 4, for example. In one example, a serial number address allocated to the intermediate communication device 2-1 is "BBBB". A serial number allocated to the intermediate communication device 2-N is "DDDD" in one example.

Each intermediate communication device 2 includes a plurality of communication ports 21, a plurality of communication ports 22, and a setting port 23. The communication ports 21 and the communication ports 22 may be connected to each other in advance based on device setting information in the intermediate communication device 2.

The communication ports 21 and the communication ports 22 of the intermediate communication device 2 and the physical ports 31 of the switching device 3 are connected to each other in advance using optical fibers. In FIG. 9, the physical port 31 "#1" and the communication port 22 "#1" of the intermediate communication device 2-1 are connected to each other in advance in one example. The physical port 31 "#2" and the communication port 22 "#2" of the intermediate communication device 2-1 are connected to each other in advance. The physical port 31 "#4" and the communication port 22 "#2" of the intermediate communication device 2-N are connected to each other in advance. The physical port 31 "#5" and the communication port 22 "#3" of the intermediate communication device 2-N are connected to each other in advance. The setting port 23 of the intermediate communication device 2 and the communication control device 6 are connected to each other in advance using a communication cable. The setting port 23 transmits and receives signals between the intermediate communication device 2 and the communication control device 6.

The switching device 3 includes a plurality of physical ports 31 and a control port 32. The switching device 3 is, for example, an RPP or a crossbar switch. The physical ports 31 transmit and receive optical signals between the intermediate communication device 2 and the switching device 3. Also, the physical ports 31 transmit and receive optical signals between the measurement devices 13 and the switching device 3.

The control port 32 transmits and receives signals between the switching device 3 and the switching control device 5. The switching device 3 switches a transmission path of optical signals between the upper network 1 and the lower network 4 in units of combinations of physical ports 31 in accordance with control performed by the switching control device 5.

The switching control device 5 outputs, to the switching device 3, an instruction for switching a transmission path such that the transmission path passes a physical port 31 selected by the upper control device 8. In a case in which the physical port 31 "#1" is selected, for example, the transmission path in the switching device 3 is switched such that the transmission path passes through the physical port 31 connected to the measurement device 13 and the physical port 31 "#1" selected by the upper control device 8.

The communication control device 6 is a device that controls operations of the intermediate communication device 2. The communication control device 6 notifies the upper control device 8 of the fact that the new intermediate communication device 2 has been connected to the switching device 3.

In the case in which the new intermediate communication device 2 has been connected to the switching device 3, the upper control device 8 (information creation device) selects a physical port 31 of the switching device 3 that is "unused" in the physical wiring information.

FIG. 10 is a diagram illustrating an example of the physical wiring information. The physical wiring information illustrated in FIG. 10 is information indicating physical wiring in the communication system 110. In the physical wiring information, switching device information, measurement information, and communication device information are associated with each other for each physical port of the switching device. Hereinafter, association of a single physical port in the physical wiring information, the measurement information, and the communication device information will be referred to as "connection information". In FIG. 10, the connection information indicates a row in the physical wiring information in a table form.

The switching device information is information related to the switching device 1. The switching device information includes the physical port number of the switching device 3. The measurement information is information related to a measurement result. The measurement information includes connection state information. The connection state information is information indicating a connection state of the communication ports of the intermediate communication device 2 and the physical ports of the switching device 3. The information indicating the connection state is, for example, information indicating link-up, an error, or an unused state. Here, the "error" means that link-up and mutual communication have not been achieved, that is, link-down has occurred. "Unused" indicates that the physical port is not connected to the communication port. The communication device information is information related to the intermediate communication device 2. The communication device information includes, for example, the serial number and the communication port numbers of the intermediate communication device 2.

Returning to FIG. 9, description of the configuration example of the wiring information creation system 10 will be continued. The measurement device 13 is a device that measures optical signals. The measurement device 13 includes an intensity detection unit 131 an optical transceiver 132, an optical transceiver 133, an optical transceiver 134, and an interface 135. In FIG. 9, the intensity detection unit 131 and the physical ports 31 of the switching device 3 are connected to each other with optical fibers, and the optical transceiver 134 selected in advance and the physical ports 31 of the switching device 3 are connected to each other with optical fibers in one example.

The intensity detection unit 131 is a light power meter. The optical transceiver 132, the optical transceiver 133, the optical transceiver 134, and the interface 135 are optical transceivers that support the communication standard of the Ethernet (trade name) such as 10GBASE-SX or 10GBASE-LR, for example. In the following description, the optical transceiver 132 supports the communication standard "10GBASE-SX" in one example. The optical transceiver 133 supports the communication standard "10GBASE-LR" in one example. The optical transceiver 134 supports the communication standard "10GBASE-LX4" in one example. The communication speed of each optical transceiver can be changed within a range defined by the communication standard.

In a case in which the physical port 31 "#1" is selected by the upper control device 8, for example, the physical port 31 "#1" and the intensity detection unit 131 are connected by the switching device 3. The measurement device 13 measures optical signals (port states) of the connected physical ports 31 in accordance with control performed by the connection control device 14.

The intensity detection unit 131 measures the intensity of the optical signal at the physical port 31 "#1" connected to the intensity detection unit 131 with the communication speed changed. In a case in which link-up or mutual communication has been achieved between the physical port 31 "#1" of the intermediate communication device 2 and the measurement device 13, the intensity of the optical signal at the physical port 31 "#1" increases as compared with a case in which link-up or mutual communication has not been achieved between the physical port 31 "#1" and the measurement device 13. The connection control device 14 can thus detect the physical port 31 connected to the communication port 21 or the communication port 22 via the optical fiber based on the result of measuring the intensity of the optical signal at the physical port 31.

In a case in which the connection control device 14 determines that the intensity of the optical signal at the physical port 31 "#1", for example, connected to the intensity detection unit 131 is equal to or greater than a threshold value, then the physical port 31 "#1" and the optical transceiver 134 selected in advance are connected by the switching device 3. The optical transceiver 134 connected to the physical port 31 "#1" executes communication with the physical port 31 "#1" based on the communication standard "10GBASE-LX4". Whether link-up has been achieved at the physical port 31 "#1" is determined based on whether the communication performed by the optical transceiver 134 has successively been performed.

Similarly, in a case in which the connection control device 14 determines that the intensity of the optical signal at the physical port 31 "#2" connected to the intensity detection unit 131 is equal to or greater than a threshold value, then the physical port 31 "#2" and the optical transceiver 134 selected in advance are connected by the switching device 3. The optical transceiver 134 similarly executes communication on the physical port 31 "#2" at which the intensity of the optical signal is equal to or greater than the threshold value.

The optical transceiver 134 similarly executes communication on the physical ports 31 "#4" and "#5" at which the intensity of the optical signals is determined to be equal to or greater than the threshold value. Whether link-up or mutual communication has been achieved at the physical ports 31 "#4" and "#5" is determined based on whether communication performed by the optical transceiver 134 has successively been performed.

The connection control device 14 acquires, from the measurement device 13, information regarding the communication standard of the optical transceiver connected to the selected physical port 31. The connection control device 14 acquires, from the intermediate communication device 2, the number (the serial number, for example) of the intermediate communication device 2 connected to the selected physical port 31. The connection control device 14 acquires, from the intermediate communication device 2, the number of communication port 22 connected to the selected physical port 31. The connection control device 14 acquires, from the intermediate communication device 2, the number of the communication port of the intermediate communication device 2 by the measurement device 13 executing a loopback command.

The connection control device 14 may acquire, from the intermediate communication device 2, the number of communication port of the intermediate communication device 2 by the measurement device 13 transmitting a link layer discovery protocol (LLDP) packet to a multicast address. After the measurement device 13 transmits the LLDP packet to the multicast address, the intermediate communication device 2 acquires predetermined information such as an interface number from the LLDP packet. After the intermediate communication device 2 transmits the LLDP packet to the multicast address, the connection control device 14 may acquire predetermined information such as an interface number from the LLDP packet.

The connection control device 14 determines whether the communication port of the intermediate communication device 2 and the selected physical port 31 have been connected to each other. The connection control device 14 determines whether the communication port 21 or the communication port 22 of the intermediate communication device 2 and the selected physical port 31 have been connected, based on a result of measuring light intensity of an optical signal in the transmission path of the selected physical port 31. In a case in which link-up or mutual communication has been achieved between the physical port 31 of the intermediate communication device 2 and the measurement device 13, the intensity of the optical signal increases as compared with a case in which link-up or mutual communication has not been achieved between the physical port 31 and the measurement device 13. It is thus possible for the connection control device 14 to detect the physical port 31 connected to the communication port 21 or the communication port 22 via the optical fiber based on the result of measuring the intensity of the optical signal.

The connection control device 14 determines whether link-up or mutual communication has been achieved between the intermediate communication device 2 and the measurement device 13 at the selected physical port 31. Here, the expression that link-up has been achieved means that the measurement device 13 and the intermediate communication device 2 (facing device) have been connected to each other and the measurement device 13 and the intermediate communication device 2 are brought into a communicable state. In a case in which the measurement device 13 performs communication using an Ethernet (trade name) protocol, for example, a physical layer (layer 1) of the measurement device 13 and a physical layer of the intermediate communication device 2 are connected to each other, and a state in which communication using the protocol can be performed in a data link layer (layer 2) is achieved. The expression that mutual communication has been achieved means that execution of a test signal such as "Ping" or loopback or data transfer has successfully been performed.

Next, an operation example of the wiring information creation system 10 will be described.

Figure 11:
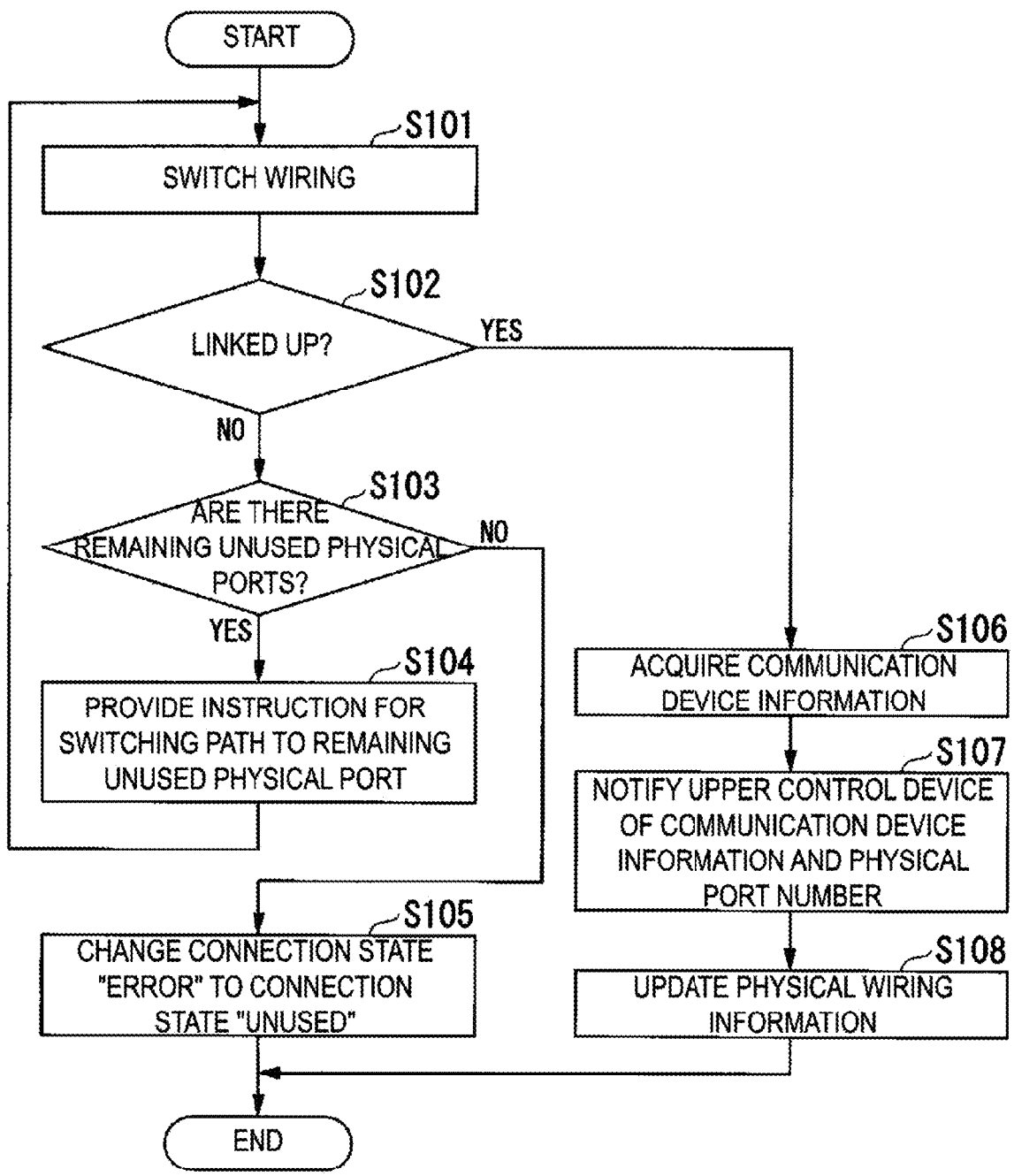
FIG. 11 is a flowchart illustrating an operation example of the wiring in information creation system according to the first embodiment.

FIG. 11 is a flowchart illustrating an operation example of the wiring information creation system 10. The switching control device 5 switches wiring (paths) inside the switching device 3 in units of combinations of physical ports 31 in response to control performed by the connection control device 14 (Step S101). The connection control device 14 determines whether link-up or mutual communication has been achieved between the communication port 22 of the intermediate communication device 2 and the optical transceiver 134 of the measurement device 13-2 (Step S102).

In a case in which link-up or mutual communication has not been achieved between the communication port 22 of the intermediate communication device 2 and the optical transceiver 134 of the measurement device 13-2 (Step S102: NO), the upper control device 8 determines whether there are remaining unused physical ports 31 of the switching device 3 (Step S103). In a case in which there are remaining unused physical ports 31 (Step S103: YES), the switching control device 5 outputs, to the switching device 3, an instruction for switching the path to the remaining unused physical ports 31 (Step S104). The wiring information creation system 10 returns the processing to Step S101.

In a case in which there are no remaining unused physical ports 31 in the switching device 3 (Step S103: NO), the upper control device 8 changes the connection state "error" in the physical wiring information to a connection state "unused" indicating that the physical port 31 is not connected to the communication port 22 (Step S105).

In a case in which link-up or mutual communication has been achieved between the communication port 22 of the intermediate communication device 2 and the optical transceiver 134 of the measurement device 13-2 (Step S102: YES), the connection control device 14 acquires communication device information from the intermediate communication device 2 via the measurement device 13-2 (Step S106). The connection control device 14 notifies the upper control device 8 of the communication device information of the intermediate communication device 2 and the physical port number of the switching device 3 (Step S107). The upper control device 8 creates connection information related to the physical port number based on the communication device information and the physical port number of the switching device 3. The upper control device 8 updates physical wiring information using the connection information. The upper control device 8 may transmit the physical wiring information to the terminal device 9 (Step S108).

The "connection state" in the physical wiring information is defined through Steps S101 to Step S104. In Step S106, the "communication device information" in the physical wiring information is defined.

The wiring information creation system 10 also performs operations between the communication port 21 of the intermediate communication device 2 and the optical transceiver 134 of the measurement device 13-1 similarly to the operations illustrated in FIG. 11.

Figure 12:
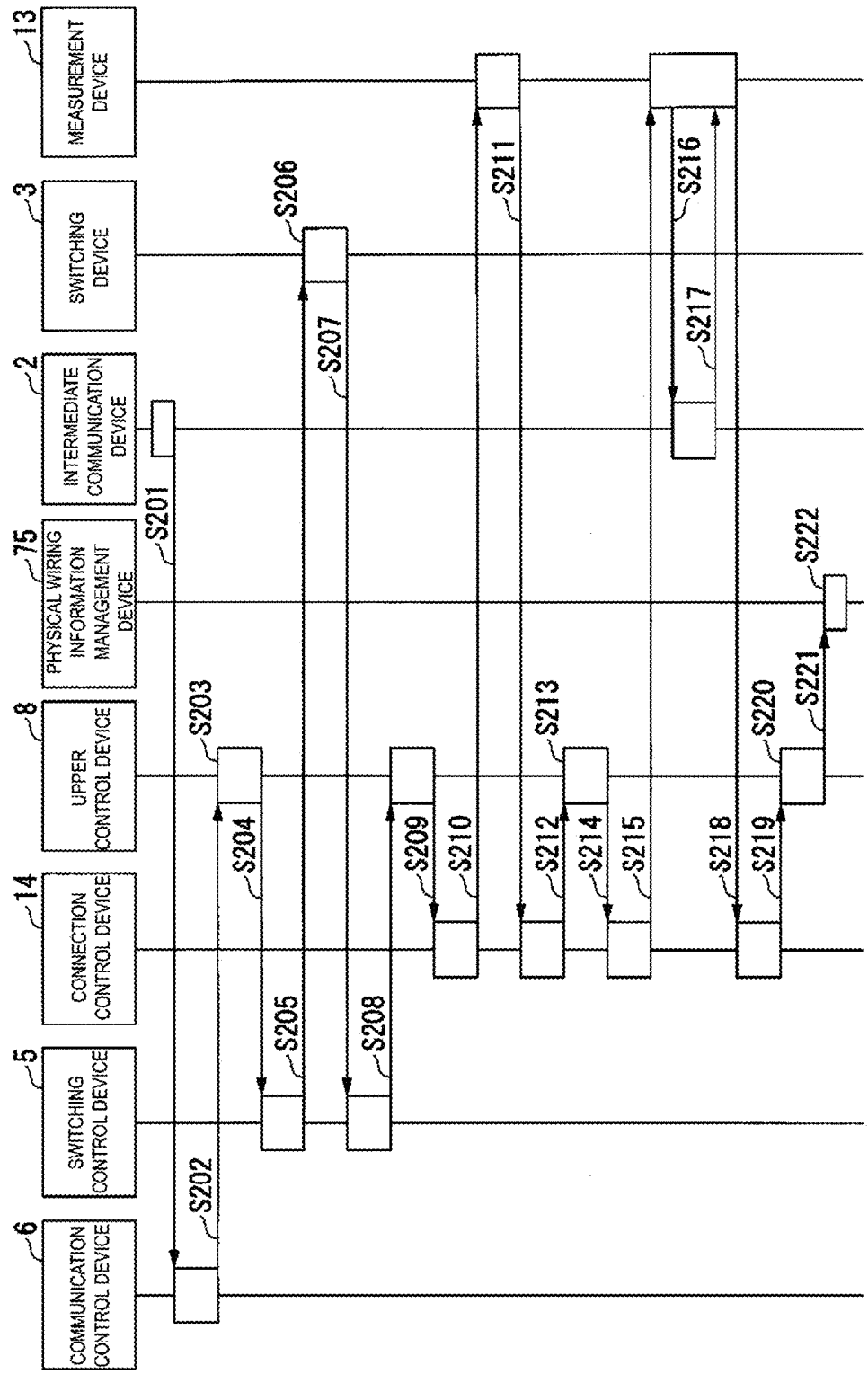
FIG. 12 is a sequence diagram illustrating an operation example of the wiring information creation system according to the first embodiment.

FIG. 12 is a sequence diagram illustrating an operation example of the wiring information creation system 10. The intermediate communication device 2 notifies the communication control device 6 of the fact that the intermediate communication device 2 has been connected to the switching device 3 (Step S201). The communication control device 6 notifies the upper control device 8 of the fact that the new intermediate communication device 2 has been connected to the switching device 3 (Step S202). The upper control device 8 selects a physical port 31 that is defined as being "unused" in the physical wiring information. The upper control device 8 stores the number of selected physical port 31 (Step S203). The upper control device 8 outputs, to the switching control device 5, an instruction for switching the path to the physical port 31 of the stored number (Step S204). The switching control device 5 outputs, to the switching device 3, the instruction for switching the path to the selected physical port 31 (Step S205).

The switching device 3 switches the path to the selected physical port 31. In FIG. 9, the physical ports 31 at which intensity of the optical signals is equal to or greater than the threshold value are the physical ports 31 "#1", "#2", "#4", and "#5" in one example. In this manner, connection between the selected physical port 31 and the optical transceiver 134 selected in advance in the measurement device 13-2 is completed (Step S206).

The switching device 3 notifies the switching control device 5 of the fact that the processing of switching the path to the selected physical port 31 has been completed (Step S207). The switching control device 5 notifies the upper control device 8 of the fact that the processing of switching the path has been completed (Step S208).

The upper control device 8 outputs, to the connection control device 14, an instruction for checking the connection state (whether link-up or mutual communication has been achieved) (Step S209). The connection control device 14 outputs the instruction for checking the connection state to the measurement device 13-2 (Step S210). The measurement device 13-2 notifies the connection control device 14 of the connection state of the selected physical port 31 (Step S211). The connection control device 14 notifies the upper control device 8 of the connection state of the selected physical port 31 (Step S212).

The upper control device 8 stores measurement information (connection state) of the physical port 31 defined as being "unused" in the physical wiring information (Step S213). The upper control device 8 outputs, to the connection control device 14, an instruction for acquiring communication device information of the intermediate communication device 2 connected to the physical port 31, the measurement information of which has been stored (Step S214). The connection control device 14 outputs an instruction for acquiring the communication device information to the measurement device 13-2 (Step S215).

The measurement device 13-2 outputs, to the intermediate communication device 2 connected to the physical port 31, the measurement information of which has been stored, an instruction for transmitting the communication device information (Step S216). The intermediate communication device 2 notifies the measurement device 13-2 of the communication device information (Step S217). The measurement device 13-2 notifies the connection control device 14 of the communication device information (Step S218). The connection control device 14 notifies the upper control device 8 of the communication device information (Step S219).

The upper control device 8 creates connection information of the selected physical port 31 by associating the number of the physical port 31 stored in Step S203 with the communication device information provided as a notification (Step S220). The upper control device 8 updates the physical wiring information based on the created connection information (Step S221).

The wiring information creation system 10 also performs operations between the communication port 21 of the intermediate communication device 2 and the optical transceiver 134 of the measurement device 13-1 similarly to the operations illustrated in FIG. 12.

As described above, the wiring information creation system 10 according to the first embodiment includes the switching device 3, the switching control device 5, the connection control device 14, and the upper control device 8 (information creation device). The switching device 3 switches the transmission path of optical signals between the upper network 1 and the lower network 4 in units of combinations of physical ports 31. The switching control device 5 outputs, to the switching device, the instruction for switching the transmission path such that the transmission path passes through the selected physical port. The connection control device 14 determines whether the communication port of the intermediate communication device that relays communication between the upper network and the lower network and the selected physical port have been connected. The connection control device 14 acquires, from the intermediate communication device 2, the number of the communication port 21 or the communication port 22 connected to the selected physical port. The upper control device 8 (information creation device) creates connection information indicating the communication port 21 or the communication port 22 connected to the selected physical port 31. The upper control device 8 updates the physical wiring information indicating the connection information for each physical port 31 of the switching device 3.

The wiring information creation system 10 according to the first embodiment can thus create information regarding the physical wiring between the physical port 31 of the switching device 3 and the communication port 21 or the communication port 22 of the intermediate communication device 2.

It is possible for an operator to ascertain the physical wiring information when the operator switches the physical connection between the switching device 3 and the intermediate communication device 2 in the central office from a remote location. The operator can set the wiring between the intermediate communication devices 2 included in the central office such as a data center using the switching device 3 from a remote location based on the physical wiring information. There is thus no need for the engineers to set wiring between the intermediate communication devices 2 as defined by written instructions in the central office. Also, there is no risk that the engineers erroneously set the wiring due to human errors.

It is possible to reduce engineers' procedures for performing checking operations at the time of connecting the switching device 3 to the intermediate communication devices 2. It is possible to improve the availability of communication system 110. It is possible to simplify the connecting operations performed when the intermediate communication devices 2 are installed in the central office.

Modification Examples

The upper control device 8 may periodically (every one hour, for example) select the physical ports 31 of the switching device 3. In a case in which link-down has been detected at a communication port of the intermediate communication device 2 due to breakdown or the like of the intermediate communication device 2, the upper control device 8 includes error information in the connection information of the communication port on which link-down has been detected. In a case in which link-up on the communication port that was linked down has been detected, the wiring information creation system 10 may execute the processing (for example, the operations illustrated in FIGS. 11 and 12) described above in the first embodiment again, in a case in which link-up on the communication port that was linked down has been detected, the upper control device 8 newly creates connection information of the communication port on which the link-up has been detected. The upper control device 8 updates the physical wiring information based on the created connection information.

In a case in which the connection information of the communication port that was linked down is the same as the newly created connection information, the upper control device 8 deletes or overwrites the error information in the connection information of the communication port on which the link-down has been detected. In a case in which link-up on the communication port that was linked down has been detected, the wiring information creation system 10 may execute the processing (for example, the operations illustrated in FIGS. 11 and 12) described above in the first embodiment again. In a case in which link-up on the communication port that was linked down has been detected, the upper control device 8 newly creates connection information of the communication port on which the link-up has been detected. In a case in which the connection information of the communication port that was linked down is different from the newly created connection information, the upper control device 8 updates the physical wiring information based on the newly created connection information.

Second Embodiment

The second embodiment is different from the first embodiment in that physical wiring information includes speed information and communication standard information. In the second embodiment, differences from the first embodiment will be described.

Figure 13:
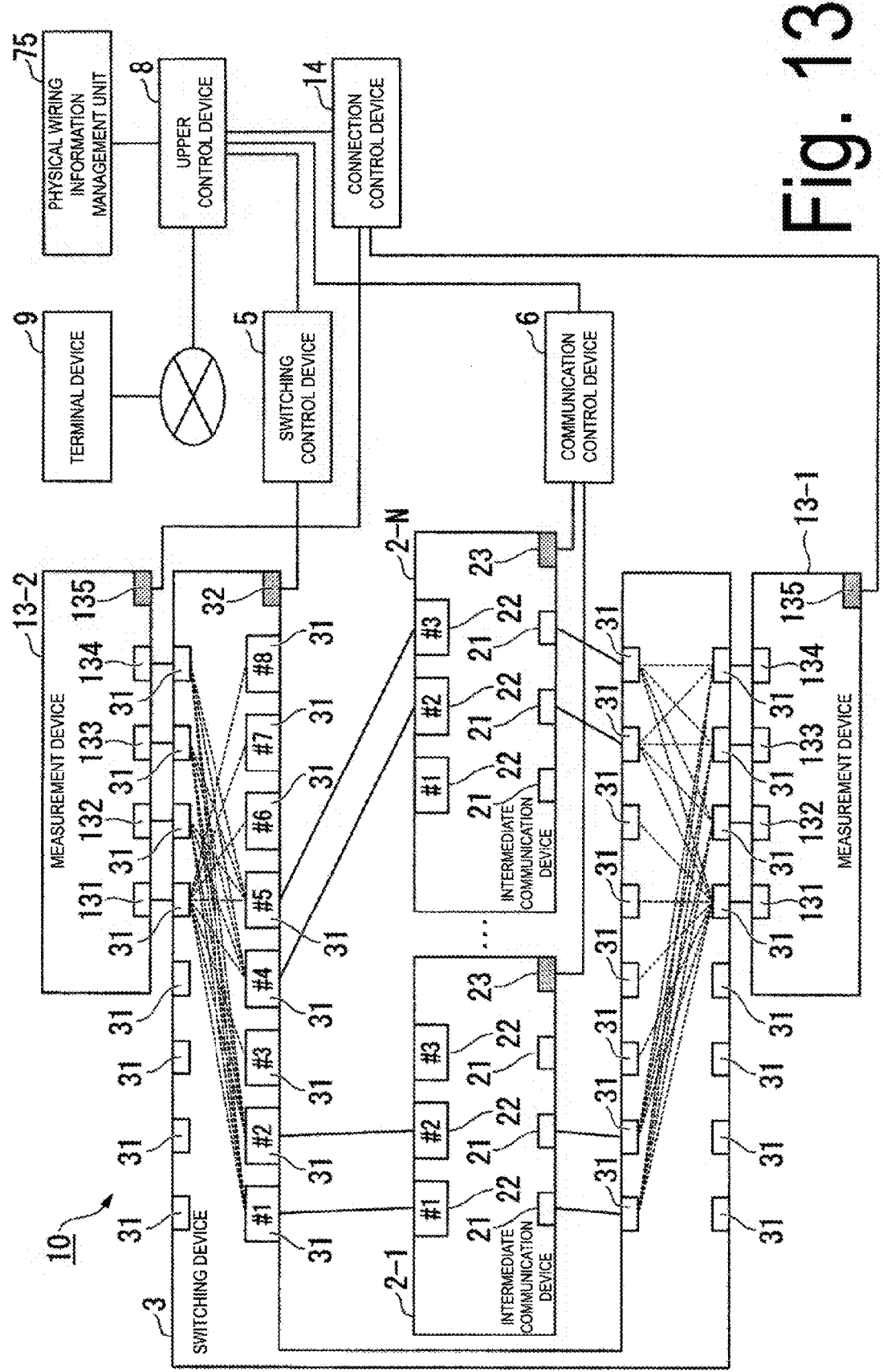
FIG. 13 is a diagram illustrating a configuration example of a wiring information creation system according to a second embodiment.

FIG. 13 is a diagram illustrating a configuration example of the wiring information creation system 10. The measurement device 13 includes an intensity detection unit 131, an optical transceiver 132, an optical transceiver 133, an optical transceiver 134, and an interface 135. In FIG. 13, the intensity detection unit 131 and a physical port 31 of the switching device 3 are connected to each other with an optical fiber, and the optical transceiver 132 and a physical port 31 of the switching device 3 are connected to each other with an optical fiber in one example. Also, the optical transceiver 133 and a physical port 31 of the switching device 3 are connected to each other with an optical fiber, and the optical transceiver 134 and a physical port 31 of the switching device 3 are connected to each other with an optical fiber.

In a case in which the connection control device 14 determines that the intensity of an optical signal at the physical port 31 "#1", for example, connected to the intensity detection unit 131 is equal to or greater than a threshold value, then the physical port 31 "#1" and the optical transceiver 132 are connected to each other by the switching device 3. The optical transceiver 132 connected to the physical port 31 "#1" executes communication with the physical port 31 "#1" based on the communication standard "10GBASE-SX". In a case in which the optical transceiver 132 has successfully performed the communication, the connection control device 14 determines that the communication standard of the optical signal at the physical port 31 "#1" is the communication standard "10GBASE-SX" of the optical transceiver 132.

In a case in which the optical transceiver 132 has not successfully performed communication, the physical port 31 "#1" and the optical transceiver 133 are connected to each other by the switching device 3. The optical transceiver 133 connected to the physical port 31 "#1" executes communication with the physical port 31 "#1" based on the communication standard "10GBASE-LR". In a case in which the optical transceiver 133 has successfully performed the communication, the connection control device 14 determines that the communication standard of the optical signal at the physical port 31 "#1" is the communication standard "10GBASE-LR" of the optical transceiver 133.

In a case in which the optical transceiver 133 has not successfully performed communication, the physical port 31 "#1" and the remaining optical transceiver 134 are connected to each other by the switching device 3. The optical transceiver 134 connected to the physical port 31 "#1" executes communication with the physical port 31 "#1" based on the communication standard "10GBASE-LX4". In a case in which the optical transceiver 134 has successfully performed the communication, it is determined that the communication standard of the optical signal at the physical port 31 "#1" is the communication standard "10GBASE-LX4" of the optical transceiver 133. In a case in which the optical transceiver 134 has not successfully performed the communication, it is determined that the communication standard of the optical signal at the physical port 31 "#1" is an "error".

FIG. 14 is a diagram illustrating an example of physical wiring information. Measurement information includes connection state information, speed information, and communication standard information. The speed information is information indicating a result obtained by the connection control device 14 determining the communication speed. The communication standard information is information indicating a result obtained by the connection control device 14 determining the communication standard.

Figure 15:
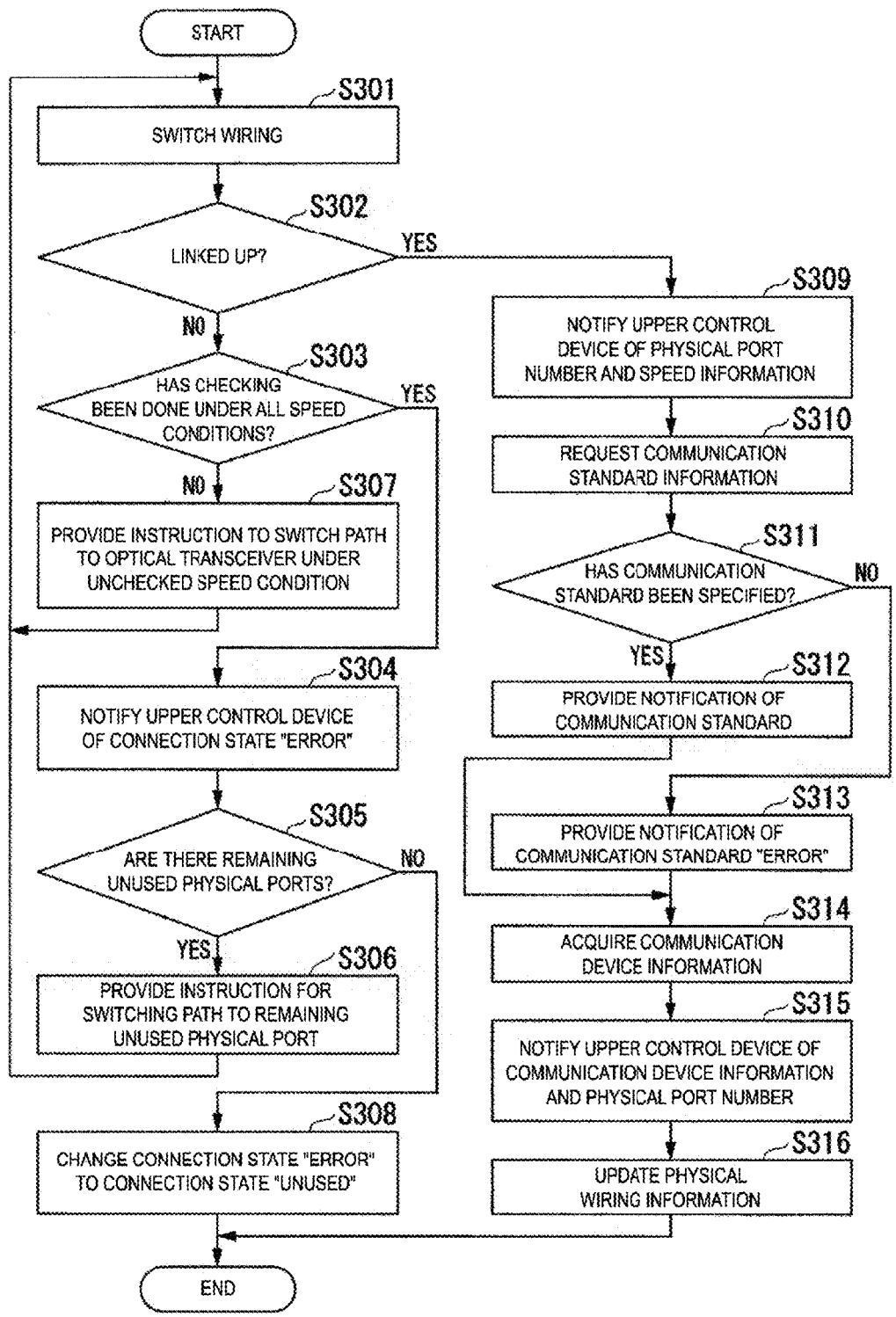
FIG. 15 is a flowchart illustrating an operation example of the wiring information creation system according to the second embodiment.

FIG. 15 is a flowchart illustrating an operation example of the wiring information creation system 10. The switching control device 5 switches the wiring (path) inside the switching device 3 in units of combinations of physical ports 31 in response to control performed by the connection control device 14 (Step S301). The connection control device 14 determines whether link-up or mutual communication has been achieved between the communication port 22 of the intermediate communication device 2 and the optical transceiver 134 of the measurement device 13-2 (Step S302).

In a case in which link-up or mutual communication has not been achieved between the communication port 22 of the intermediate communication device 2 and the optical transceiver 134 of the measurement device 13-2 (Step S302: NO), the connection control device 14 determines whether the fact that neither link-up nor mutual communication has been achieved has been confirmed under all communication speed conditions in the measurement device 13 (Step S303). In a case in which the fact that neither link-up nor mutual communication has been achieved has been confirmed under all the communication speed conditions (Step S303: YES), the connection control device 14 notifies the upper control device 8 of the connection state "error" (Step S304). The upper control device 8 determines whether there are remaining unused physical ports 31 in the switching device 3 (Step S305).

In a case in which there are remaining unused physical ports 31 in the switching device 3 (Step S305: YES), the switching control device 5 outputs, to the switching device 3, an instruction for switching the path to the remaining unused physical ports 31 (Step S306). The wiring information creation system 10 returns the processing to Step S301.

In a case in which the fact that neither link-up nor mutual communication has not been achieved has not been confirmed under any of the communication speed conditions (Step S303: NO), the switching control device 5 outputs, to the switching device 3, an instruction for switching the path to the optical transceiver under the unconfirmed speed conditions (Step S307). The wiring information creation system 10 returns the processing to Step S301.

In a case in which there are no remaining unused physical ports 31 in the switching device 3 (Step S305: NO), the upper control device 8 changes the connection state "error" in the physical wiring information to a connection state "unused" indicating that the physical port 31 is not connected to the communication port 22 (Step S308).

In a case in which link-up or mutual communication has been achieved between the communication port 22 of the intermediate communication device 2 and the optical transceiver 134 of the measurement device 13-2 (Step S302: YES), the connection control device 14 notifies the upper control device 8 of the physical port number and the speed information (Step S309). The connection control device 14 requests the measurement device 13 for information regarding the communication standard of the optical transceiver that has achieved the link-up or the mutual communication (Step S310).

The connection control device 14 determines whether the communication standard of the optical transceiver has been specified, based on acquired information regarding the communication standard (Step S311). In a case in which the communication standard of the optical transceiver has been specified (Step S311: YES), the connection control device 14 notifies the upper control device 8 of the communication standard of the optical transceiver that has achieved the link-up or the mutual communication (Step S312). In a case in which the communication standard of the optical transceiver has not been specified (Step S311: NO), the connection control device 14 notifies the upper control device 8 of a communication standard "error" (Step S313).

The connection control device 14 acquires the communication device information from the intermediate communication device 2 via the measurement device 13-2 (Step S314). The connection control device 14 notifies the upper control device 8 of the communication device information of the intermediate communication device 2 and the physical port number of the switching device 3 (Step S315). The upper control device 8 creates connection information related to the physical port number based on the communication device information and the physical port number of the switching device 3. The upper control device 8 updates wiring information using the connection information (Step S316).

The "connection state" and the "speed" in the physical wiring information are defined through Steps S301 to Step S307. The "communication standard" in the physical wiring information is defined through Step S310 to Step S313. The "communication device information" in the physical wiring information is defined in Step S314.

The wiring information creation system 10 performs operations between the communication port 21 of the intermediate communication device 2 and the optical transceivers 132 to 134 of the measurement device 13-1 similarly to the operations illustrated in FIG. 15.

Figure 16:
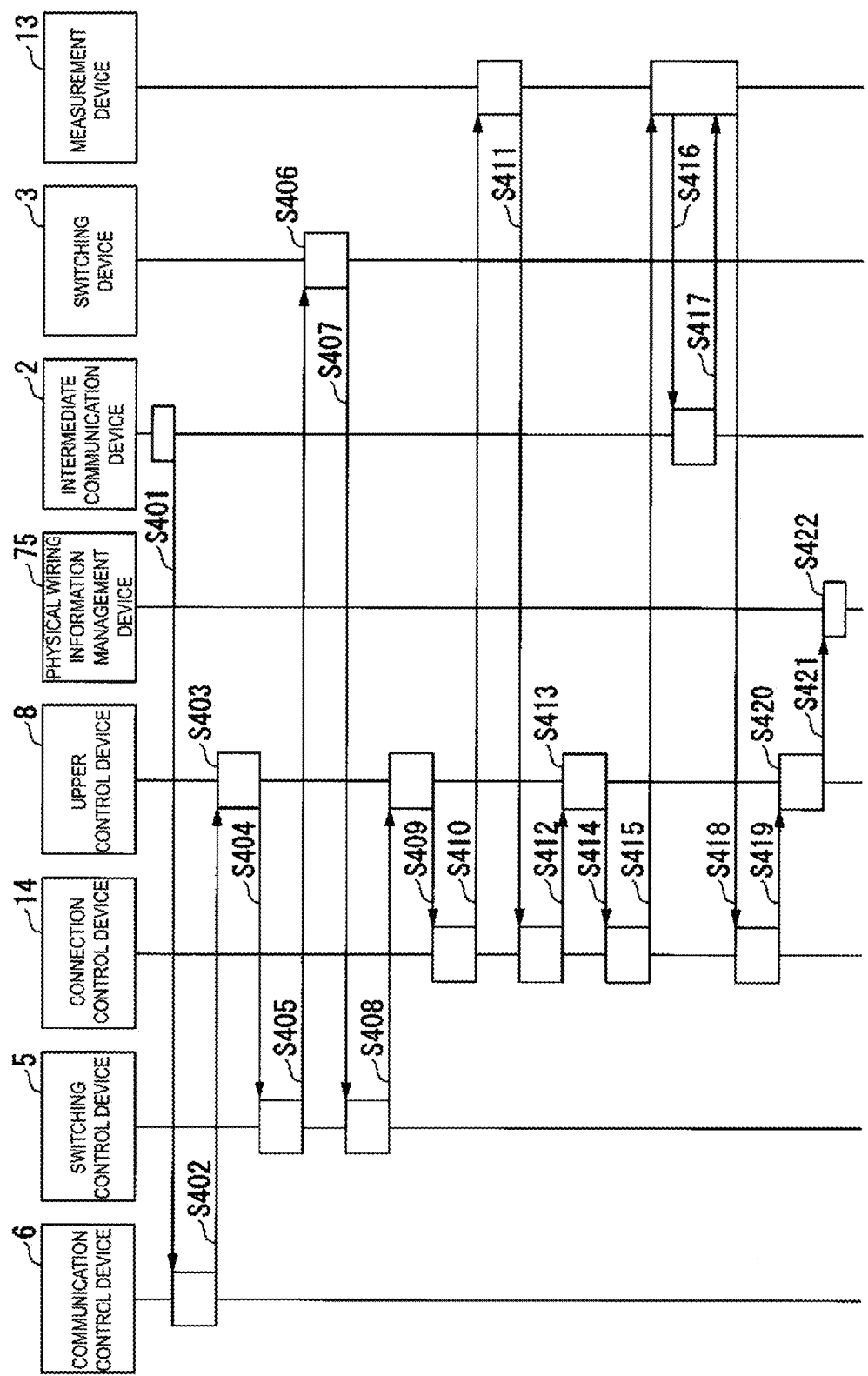
FIG. 16 is a sequence diagram illustrating an operation example of the wiring information creation system according to the second embodiment.

FIG. 16 is a sequence diagram illustrating an operation example of the wiring information creation system 10. The operations in Steps S401 to S412 are similar to the operations in Steps S201 to S212 illustrated in FIG. 12.

The upper control device 8 determines whether the connection state of the selected physical port 31 corresponds to link-up or mutual communication. In a case in which the connection state corresponds to link-up or mutual communication, the upper control device 8 stores measurement information (connection state) of the physical port 31 defined as being "unused" in the physical wiring information. In a case in which the connection state corresponds to neither the link-up nor the mutual communication, the upper control device 8 returns the processing to Step S404 and outputs, to the switching control device 5, an instruction for switching the path to the physical port 31 of the stored number and the remaining optical transceiver in the measurement device 13 (Step S413).

In this manner, the upper control device 8 repeats the operations in Steps S404 to S413 until link-up or mutual communication is achieved between the intermediate communication device 2 and the optical transceiver or until all the optical transceivers in the measurement device 13 are connected to the intermediate communication device 2 one by one.

The operations in Steps S414 to S422 are similar to the operations in Steps S214 to S222 illustrated in FIG. 12.

The wiring information creation system 10 also performs operations between the communication port 21 of the intermediate communication device 2 and the optical transceivers 132 to 134 of the measurement device 13-1 similarly to the operations illustrated in FIG. 16.

As described above, the upper control device 8 according to the second embodiment creates connection information further indicating the communication standard of the communication port of the intermediate communication device 2 for each physical port 31 of the switching device 3, based on the acquired information regarding the communication standards of the optical transceivers. The upper control device 8 updates the physical wiring information using the connection information including the speed information and the communication standard information. In this manner, the wiring information creation system 10 according to the second embodiment can create the physical wiring information including the speed information and the communication standard information in the communication system 110.

Third Embodiment

The third embodiment is different from the first embodiment and the second embodiment in that an intensity detection device that detects intensity of optical signals is included between the switching device and the intermediate communication device. In the third embodiment, differences from the first and second embodiments will be described.

In a case in which a path is switched for each physical port 31 of the switching device 3, a time from the start to the completion of the switching is long. Thus, the time required to specify the communication port connected to the physical port 31 is long in a case in which the number of physical ports 31 of the switching device 3 is large. In order to shorten the time required to specify the communication port, the intensity of the optical signal at each physical port 31 of the switching device 3 is measured in real time by the light power meter.

Figure 17:
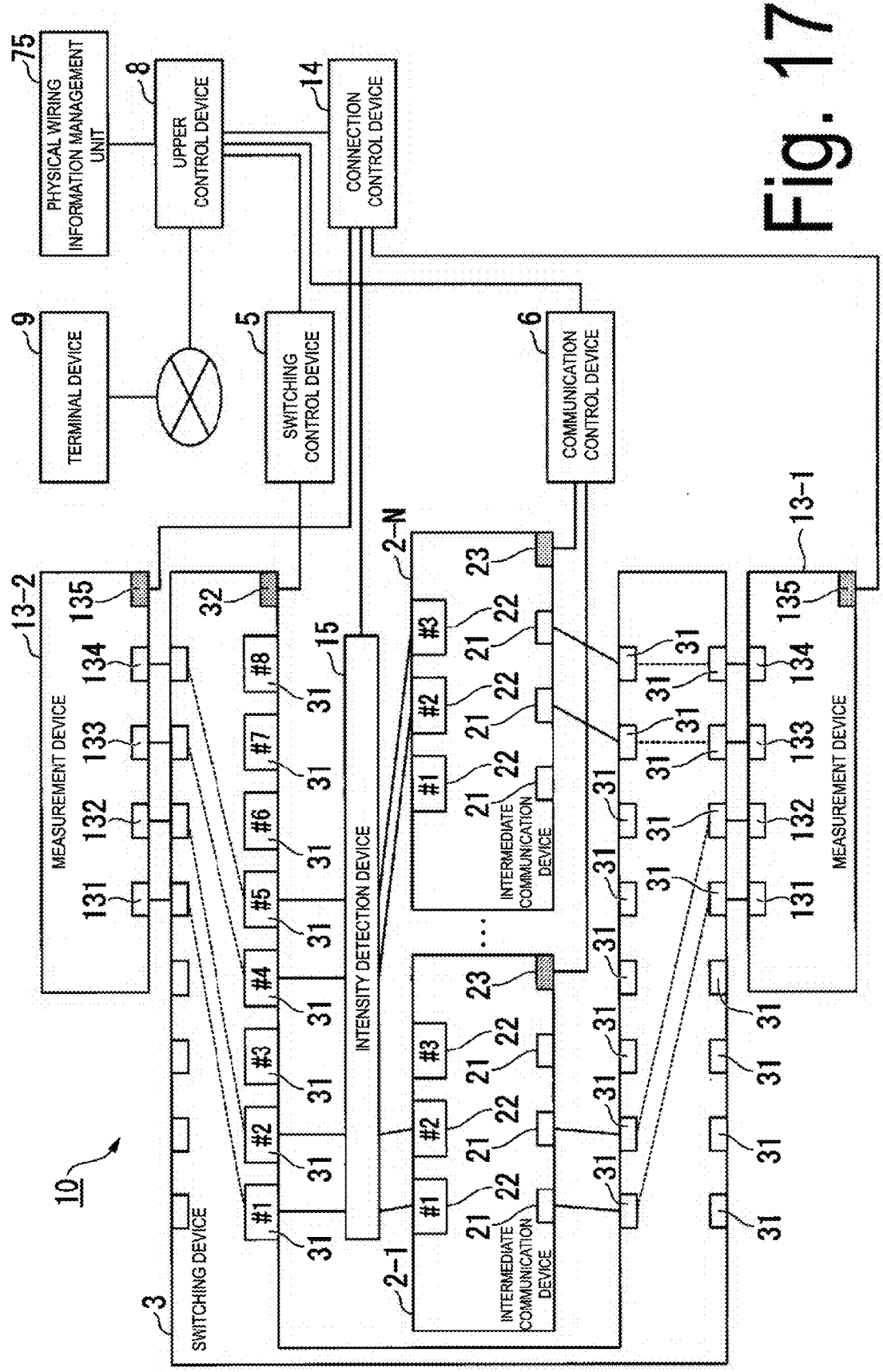
FIG. 17 is a diagram illustrating a configuration example of a wiring information creation system according to a third embodiment.

FIG. 17 is a diagram illustrating a configuration example of the wiring information creation system 10. The wiring information creation system 10 illustrated in the third embodiment further includes an intensity detection device 15 (light power meter) as compared with the wiring information creation system 10 illustrated in the first embodiment or the second embodiment. The intensity detection device 15 includes a plurality of detection ports that detect light intensity. The intensity detection device 15 is included as an in-line multi-port light power meter between the intermediate communication device 2 and the switching device 3. The intensity detection device 15 is connected to the intermediate communication device 2 and the switching device 3 using optical fibers. The intensity detection device 15 detects at least either an increase in intensity of the optical signals or a decrease in intensity of the optical signals between the upper network 1 and the lower network 4.

The intensity detection device 15 detects at least either an increase in intensity of the optical signals or a decrease in intensity of the optical signals between the upper network 1 and the lower network 4. The increase in intensity of the optical signals indicates that new paths of the optical signals have achieved link-up.

In a case in which total intensity of the optical signals at each physical port 31 connected to each detection port of the intensity detection device 15 has increased (link-up has been detected), the connection control device 14 acquires the numbers of the communication ports 22 of the intermediate communication device 2 connected to the physical port 31 on which an increase in intensity of the optical signals have been detected from the intermediate communication device 2 via the optical transceivers of the measurement device 13.

In a case in which the intensity of an optical signal of at least one physical port 31 connected to each detection port of the intensity detection device 15 has increased (link-up has been detected), the connection control device 14 may acquire the number of the communication port 22 of the intermediate communication device 2 connected to the physical port 31 on which the increase in intensity of the optical signal has been detected from the intermediate communication device 2 via the optical transceivers of the measurement device 13.

In a case in which total intensity of the optical signals at each physical port 31 connected to each detection port of the intensity detection device 15 has decreased (link-down has been detected), the connection control device 14 includes error information in the connection information of the communication ports 22 of the intermediate communication device 2 connected to the physical ports 31 on which the decrease in intensity of the optical signals has been detected.

In a case in which the intensity of the optical signal of at least one physical port 31 connected to each detection port of the intensity detection device 15 has decreased (linkdown has been detected), the connection control device 14 may include error information in the connection information of the communication port 22 of the intermediate communication device 2 connected to the physical port 31 on which the decrease in intensity of the optical signal has been detected.

As described above, the wiring information creation system 10 according to the third embodiment further includes the intensity detection device 15 (in-line power meter). The intensity detection device 15 detects at least either an increase in intensity of the optical signals or a decrease in intensity of the optical signals between the upper network 1 and the lower network 4. The connection control device 14 acquires the numbers of the communication ports of the intermediate communication device connected to the physical ports on which an increase in intensity of the optical signals has been detected.

The wiring information creation system 10 according to the third embodiment can thus create the information regarding the physical wiring between the physical port 31 of the switching device 3 and the communication port 21 or the communication port 22 of the intermediate communication device 2 in real time.

The embodiments of the present disclosure have been described above in detail with reference to the drawings. However, specific configurations are not limited to those embodiments, and include any design or the like within the scope not departing from the gist of the present disclosure.

The aforementioned embodiments may be combined with each other. The aforementioned embodiments and the aforementioned modification examples may be combined with each other.

INDUSTRIAL APPLICABILITY

The present disclosure is applicable to an optical communication system.

REFERENCE SIGNS LIST

1 Upper network
2 Intermediate communication device
3 Switching device
4 Lower network
5 Switching control device
6 Communication control device
7 Network management device
8 Upper control device
9 Terminal device
10 Wiring information creation system
11 Upper communication device
12 Communication line
13 Measurement device
14 Connection control device
15 Intensity detection device
21 Communication port
22 Communication port
23 Setting port
31 Physical port
32 Control port
41 Lower communication device
42 Communication port
51 Interface
52 Wiring information acquisition unit
53 Switching device wiring information storage unit
54 Wiring availability determination unit
55 Wiring instruction unit
56 Response receiving unit
57 Wiring information updating unit
71 Allocation management unit
72 Interface
73 Information creation unit
74 Allocation information storage unit
75 Physical wiring management unit
76 Interface
77 Physical wiring information acquisition unit
78 Physical wiring information updating unit
79 Physical wiring information storage unit
100 Optical communication network
110 Communication system
111 Communication port
112 Communication port
113 Setting port
131 Intensity detection unit
132 Optical transceiver
133 Optical transceiver
134 Optical transceiver
135 Interface
411 Communication port
412 Communication port
413 Setting port

The invention claimed is:

1. A wiring information creation system comprising:
a switching device configured to switch a transmission path of an optical signal between an upper network and a lower network in units of combinations of physical ports;
a switching control device configured to output, to the switching device, an instruction for switching the transmission path such that the transmission path passes through a selected physical port of the physical ports;
a connection control device configured to determine whether a communication port of an intermediate communication device that relays communication between the upper network and the lower network and the selected physical port are connected to each other and acquire, from the intermediate communication device, a number of the communication port connected to the selected physical port; and
an information creation device configured to create connection information indicating the communication port connected to the selected physical port and update wiring information indicating connection information for each of the physical ports of the switching device,
wherein each of the switching device, the switching control device, the connection control device, and the information creation device is implemented by:
i) computer executable instructions executed by at least one processor,
ii) at least one circuitry or
iii) a combination of computer executable instructions executed by at least one processor and at least one circuitry,
wherein the connection control device acquires information regarding a communication standard of an optical transceiver connected to the selected physical port, and the information creation device creates connection information that further indicates, for each of the physical ports of the switching device, a communication standard of the communication port of the intermediate communication device based on the information regarding the communication standard of the optical transceiver that is acquired, and updates the wiring information indicating the connection information for each of the physical ports of the switching device.

2. The wiring information creation system according to claim 1, wherein the connection control device determines whether the communication port of the intermediate communication device and the selected physical port are connected to each other, based on a measurement result of light intensity of an optical signal in the transmission path of the selected physical port.

3. The wiring information creation system according to claim 1, wherein the connection control device acquires the number of the communication port from the intermediate communication device by executing communication based on a link layer discovery protocol (LLDP) or loopback.

4. The wiring information creation system according to claim 1, wherein in a case in which link-down of the communication port of the intermediate communication device is detected, the information creation device includes error information in connection information of the communication port on which the link-down is detected.

5. The wiring information creation system according to claim 4, wherein in a case in which link-up of the communication port that was linked down is detected, the information creation device newly creates connection information of the communication port on which link-up is detected, and in a case in which the connection information of the communication port that was linked down and the connection information that is newly created are identical, the information creation device deletes or overwrites the error information in the connection information of the communication port on which the link-down was detected.

6. The wiring information creation system according to claim 4, wherein in a case in which link-up of the communication port that was linked down is detected, the information creation device newly creates connection information of the communication port on which the link-up is detected, and in a case in which the connection information of the communication port that was linked down and the connection information that is newly created are different from each other, the information creation device updates the wiring information based on the connection information that is newly created.

7. The wiring information creation system according to claim 1, further comprising
an intensity detection device configured to detect at least one of an increase in intensity of the optical signal or a decrease in intensity of the optical signal between the upper network and the lower network,
wherein the connection control device acquires a number of the communication port of the intermediate communication device connected to the physical port on which the increase in intensity of the optical signal is detected.

8. The wiring information creation system according to claim 1, wherein the information creation device periodically selects a physical port of the physical ports of the switching device.

9. A wiring information creation method executed by a wiring information creation system, the method comprising:
outputting, to a switching device that switches a transmission path of an optical signal between an upper network and a lower network in units of combinations of physical ports, an instruction for switching the transmission path such that the transmission path passes through a selected physical port of the physical ports;
determining whether a communication port of an intermediate communication device that relays communication between the upper network and the lower network and the selected physical port are connected to each other and acquiring, from the intermediate communication device, a number of the communication port connected to the selected physical port; and
creating connection information indicating the communication port connected to the selected physical port and updating wiring information indicating connection information for each of the physical ports of the switching device,
wherein acquiring information regarding a communication standard of an optical transceiver connected to the selected physical port, and
creating connection information that further indicates, for each of the physical ports of the switching device, a communication standard of the communication port of the intermediate communication device based on the information regarding the communication standard of the optical transceiver that is acquired, and updating the wiring information indicating the connection information for each of the physical ports of the switching device.

* * * * *